(12) United States Patent  (10) Patent No.: US 8,527,721 B2
Atluri et al.  (45) Date of Patent: Sep. 3, 2013

(54) GENERATING A RECOVERY SNAPSHOT AND CREATING A VIRTUAL VIEW OF THE RECOVERY SNAPSHOT

(76) Inventors: Rajeev Atluri, Corona, CA (US);
Sudhakar Pannerselvam, Hyderabad (IN); Jayesh Shah, Hyderabad (IN);
Satish Kumar, Andhra Pradesh (IN);
Srin Kumar, Sunnyvale, CA (US)

( * ) Notice: Subject to any disclaimer, the term of this patent is extended or adjusted under 35 U.S.C. 154(b) by 956 days.

(21) Appl. No.: 12/344,364

(22) Filed: Dec. 26, 2008

(65) Prior Publication Data

US 2010/0169592 A1  Jul. 1, 2010

(51) Int. Cl.
*G06F 12/00* (2006.01)

(52) U.S. Cl.
USPC ............. 711/162; 711/4; 711/111; 711/112; 711/156; 707/639; 707/649; 707/651; 707/682; 707/683; 707/684

(58) Field of Classification Search
USPC ............. 711/162, 4, 111, 112, 156; 707/639, 707/649, 651, 682, 683, 684
See application file for complete search history.

(56) References Cited

U.S. PATENT DOCUMENTS

| | | | |
|---|---|---|---|
| 5,193,181 A | 3/1993 | Barlow et al. | |
| 5,313,612 A | 5/1994 | Satoh et al. | |
| 5,446,871 A | 8/1995 | Shomler et al. | |
| 5,621,882 A | 4/1997 | Kakuta | |
| 5,664,189 A | 9/1997 | Wilcox et al. | |
| 5,805,785 A | 9/1998 | Dias et al. | |
| 5,875,479 A | 2/1999 | Blount et al. | |
| 5,930,824 A | 7/1999 | Anglin et al. | |
| 6,175,932 B1 | 1/2001 | Foote et al. | |
| 6,247,141 B1 | 6/2001 | Holmberg | |
| 6,269,431 B1 * | 7/2001 | Dunham | 711/162 |
| 6,324,654 B1 | 11/2001 | Wahl et al. | |
| 6,327,579 B1 | 12/2001 | Crawford | |
| 6,490,691 B1 | 12/2002 | Kimura et al. | |
| 6,647,399 B2 | 11/2003 | Zaremba | |
| 6,691,140 B1 | 2/2004 | Bogrett | |
| 6,714,980 B1 | 3/2004 | Markson et al. | |

(Continued)

FOREIGN PATENT DOCUMENTS

WO  WO-2004021677 A1  3/2004

OTHER PUBLICATIONS

Neel, D., "Symantec Says It'll Put Data on Road to Recovery—New LiveState Une Promises Complete System Restoration," Computer Reseller News, Oct. 4, 2004, 12.

(Continued)

*Primary Examiner* — Stephen Elmore
(74) *Attorney, Agent, or Firm* — Raj Abhyanker, P.C.

(57) ABSTRACT

Methods, software suites, and systems of generating a recovery snapshot and creating a virtual view of the recovery snapshot are disclosed. In an embodiment, a method includes generating a recovery snapshot at a predetermined interval to retain an ability to position forward and backward when a delayed roll back algorithm is applied and creating a virtual view of the recovery snapshot using an algorithm tied to an original data, a change log data, and a consistency data related to an event. The method may include redirecting an access request to the original data based on a meta-data information provided in the virtual view. The method may further include substantially retaining a timestamp data, a location of a change, and a time offset of the change as compared with the original data.

20 Claims, 16 Drawing Sheets

(56) References Cited

U.S. PATENT DOCUMENTS

| | | |
|---|---|---|
| 6,742,139 B1 | 5/2004 | Forsman et al. |
| 6,833,073 B2 | 12/2004 | Agarwal |
| 6,915,315 B2 | 7/2005 | Autrey et al. |
| 6,981,177 B2 | 12/2005 | Beattie |
| 7,093,086 B1 | 8/2006 | Rietschote |
| 7,155,586 B1 | 12/2006 | Wagner et al. |
| 7,165,156 B1 | 1/2007 | Cameron et al. |
| 7,206,911 B2 | 4/2007 | Wolfgang et al. |
| 7,237,021 B2 | 6/2007 | Penney et al. |
| 7,251,749 B1 | 7/2007 | Fong et al. |
| 7,254,682 B1 | 8/2007 | Arbon |
| 7,257,595 B2 * | 8/2007 | Verma et al. .................. 707/683 |
| 2002/0008795 A1 | 1/2002 | Koyama et al. |
| 2002/0124013 A1 | 9/2002 | Loy et al. |
| 2003/0093579 A1 | 5/2003 | Zimmer et al. |
| 2004/0031030 A1 | 2/2004 | Kidder et al. |
| 2004/0093474 A1 | 5/2004 | Lin et al. |
| 2004/0199515 A1 | 10/2004 | Penney et al. |
| 2004/0205390 A1 | 10/2004 | Kanevsky et al. |
| 2005/0010835 A1 | 1/2005 | Childs et al. |
| 2005/0033930 A1 | 2/2005 | Haruma et al. |
| 2005/0044162 A1 | 2/2005 | Liang et al. |
| 2005/0050386 A1 | 3/2005 | Reinhardt et al. |
| 2005/0055603 A1 | 3/2005 | Soran et al. |
| 2005/0138090 A1 | 6/2005 | Augenstein et al. |
| 2005/0138204 A1 | 6/2005 | Iyer et al. |
| 2005/0182953 A1 | 8/2005 | Stager et al. |
| 2005/0188256 A1 | 8/2005 | Stager et al. |
| 2005/0198303 A1 | 9/2005 | Knauerhase et al. |
| 2005/0223181 A1 | 10/2005 | Jeppsen et al. |
| 2005/0240792 A1 | 10/2005 | Sicola et al. |
| 2005/0251540 A1 | 11/2005 | Sim-Tang |
| 2005/0257085 A1 | 11/2005 | Haustein et al. |
| 2005/0262097 A1 | 11/2005 | Sim-Tang et al. |
| 2005/0262377 A1 | 11/2005 | Sim-Tang |
| 2005/0267920 A1 | 12/2005 | Helliker et al. |
| 2006/0031468 A1 | 2/2006 | Atluri et al. |
| 2006/0047714 A1 | 3/2006 | Anderson et al. |
| 2006/0114497 A1 | 6/2006 | Anderson et al. |
| 2006/0149793 A1 | 7/2006 | Kushwah et al. |
| 2006/0155912 A1 | 7/2006 | Singh et al. |
| 2006/0218434 A1 | 9/2006 | Solhjell |
| 2007/0038998 A1 | 2/2007 | Fries |
| 2007/0168404 A1 | 7/2007 | Nakamura et al. |
| 2007/0244938 A1 | 10/2007 | Michael et al. |

OTHER PUBLICATIONS

Kador, J., Open Mlddleware: The Next Generation in Distributed Computing, MIDRANGE Systems, Nov. 25, 1994, v.7, n. 22, pS12(4).

Data Protection—Perform Zero Downtime Backups [ online Jan. 29, 2009]. Retrieved from the Internet URL: http://stage.hp.resource.com/sbso/bus_protect/data_protect/zero_downtime.

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL: http://www.rmwtug.org/Talks/ShadowStor/ShadowProtectdsheet.pdf.

U.S. Appl. No. 11/405,236, filed Oct. 18, 2007, Michael et al.
U.S. Appl. No. 11/438,401, filed Dec. 6, 2007, Atluri et al.
U.S. Appl. No. 11/438,036, filed Nov. 22, 2007, Atluri.
U.S. Appl. No. 11/229,289, filed Jan. 12, 2006, Atluri.

* cited by examiner

GENERATING A RECOVERY SNAPSHOT AND CREATING A VIRTUAL VIEW OF THE RECOVERY SNAPSHOT

CLAIM OF PRIORITY

This application claims priority to:

(1) U.S. patent application Ser. No. 10/859,368 titled "SECONDARY DATA STORAGE AND RECOVERY SYSTEM" filed on Jun. 1, 2004;

(2) U.S. patent application Ser. No. 11/438,401 titled "RECOVERY POINT DATA VIEW SHIFT THROUGH A DIRECTION-AGNOSTIC ROLL ALGORITHM" filed on May 22, 2006.

FIELD OF TECHNOLOGY

This disclosure relates generally to the technical fields of software and/or hardware technology and, in one example embodiment, to generating a recovery snapshot and creating a virtual view of the recovery snapshot.

BACKGROUND

Data may be stored in a manner to allow recovery of a snapshot. The snapshot may be altered to shift the position of the data in one direction. Shifting the snapshot in one direction may limit shifting the data in an additional direction, and additional hardware and/or processing time may be needed to shift the data in an additional direction. Furthermore, a snapshot may be need to be generated and/or restored before the content of the snapshot is determined, which may result in an incorrect data being acquired, and an additional snapshot being generated to find a desired data. Generation of the additional snapshot may require an otherwise unnecessary expenditure of energy, time, and financial cost.

SUMMARY

Methods, software suites, and systems of generating a recovery snapshot and creating a virtual view of the recovery snapshot are disclosed. In one aspect, a method includes generating a recovery snapshot at a predetermined interval to retain an ability to position forward and backward when a delayed roll back algorithm is applied and creating a virtual view of the recovery snapshot using an algorithm tied to an original data, a change log data, and a consistency data related to an event.

The method may include redirecting an access request to the original data based on a meta-data information provided in the virtual view. The method may further include substantially retaining a timestamp data, a location of a change, and a time offset of the change as compared with the original data. The method may include utilizing a relational database to process the change log data in a meta-data format, and to process other on-disk data using a binary-tree format. The virtual view may be specific to a volume object in a kernel that imitates another volume having the original data. The virtual view may be managed by a kernel space that processes an access request through one or more tables using a meta-data created in a retention log. The method may include exporting the virtual view as a virtual volume using one or more of an iSCSI and a fiber channel transport to an external processing device. The change log data may be applied when the virtual view may be unfrozen after a user session reaches a level state.

The method may also include generating a series of indexes of the virtual view to enable a linking to an event description of the virtual view rather than to an actual data in the original data and automatically creating the virtual view in one or more of a scheduled and an event driven manner. The method may include automatically exporting the virtual view to a physical storage medium. A machine may be caused to perform the method when a machine-readable medium embodying a set of instructions is executed by the machine using a processor and a physical memory.

In another aspect, a software suite includes a portion to generate a recovery snapshot at a predetermined interval to retain an ability to position forward and backward when a delayed roll back algorithm is applied and a portion to create a virtual view of the recovery snapshot using a processor and a physical memory to execute an algorithm tied to an original data, a change log data, and a consistency data related to an event.

The software suite may include redirecting an access request to the original data based on a meta-data information provided in the virtual view. The software suite may include a portion to substantially retain a timestamp data, a location of a change, and a time offset of the change as compared with the original data. The software suite may include a portion to utilize a relational database to process the change log data in a meta-data format, and to process other on-disk data using a binary-tree format.

The virtual view may be specific to a volume object in a kernel that imitates another volume having the original data. The virtual view may be managed by a kernel space that processes an access request through a table using a meta-data created in a retention log.

In yet another aspect, a system includes a recovery module to generate a recovery snapshot at a predetermined interval to retain an ability to position forward and backward when a delayed roll back algorithm is applied, and a virtualization module to create a virtual view of the recovery snapshot using an algorithm tied to an original data, a change log data, and/or a consistency data related to an event.

The virtualization module may redirect an access request to the original data based on a meta-data information provided in the virtual view. The virtualization module may substantially retain a timestamp data, a location of a change, and a time offset of the change as compared with the original data.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and system of recovery point data view shift through a direction-agnostic roll algorithm is disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
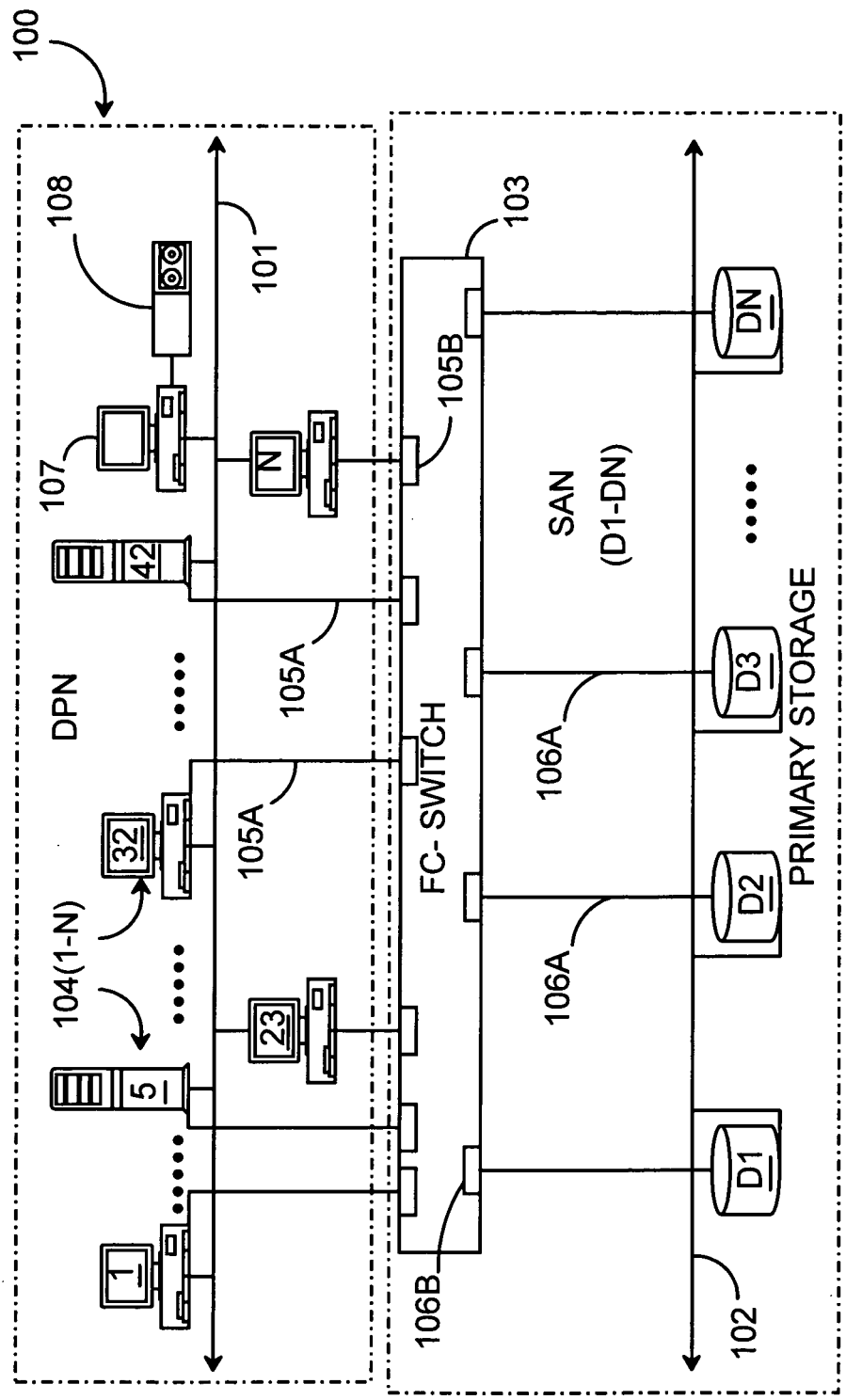
FIG. 1 is an architectural view of a typical SAN-based data storage and recovery network according to prior art.

FIG. 1 is an architectural view of a typical SAN-based data-storage and recovery network according to prior art. A data-packet-network (DPN) 100 is illustrated in this example and is typically configured as a local area network (LAN) supporting a plurality of connected nodes 104(1-N). DPN 100 may be an IP/Ethernet LAN, an ATM LAN, or another network type such as wide-area-network (WAN) or a metropolitan-area-network (MAN).
For the purpose of this example assume DPN 100 is a LAN network hosted by a particular enterprise. LAN domain 100 is further defined by a network line 101 to which nodes 104(1-N) are connected for communication. LAN domain 100 may be referred to herein after as LAN 101 when referring to connective architecture. There may be any arbitrary number of nodes 104(1-N) connected to LAN cable 101. Assume for the purposes of this example a robust LAN connecting up to 64 host nodes. Of these, nodes 1, 5, 23, 32, 42, and n are illustrated. A node that subscribes to data back-up services is typically a PC node or a server node. Icons 1, 23, 32, and n represent LAN-connected PCs. Icons 5 and 42 represent LAN connected servers. Servers and PCs 104(1-N) may or may not have their own direct access storage (DAS) devices, typically hard drives.

A PC node 107 is illustrated in this example and is reserved for archiving back-up data to a tape drive system 108 for long-term storage of data. An administrator familiar with batch-mode data archiving from disk to tape typically operates node 107 for tape backup purposes. Network 100 has connection through a FC switch 103, in this case, a SAN 102 of connected storage devices D1-DN (Disk 1, Disk N). Collectively, D1-DN are referred to herein as primary storage. SAN domain 102 is further defined by SAN network link 109 physically connecting the disks together in daisy-chain architecture. D1-DN may be part of a RAID system of hard disks for example. FC switch 103 may be considered part of the SAN network and is therefore illustrated within the domain of SAN 102.

In some cases an Ethernet switch may replace FC switch 103 if, for example, network 109 is a high-speed Ethernet network. However, for the purpose of description here assume that switch 103 is an FC switch and that network 109 functions according to the FC system model and protocol, which is well known in the art.

Each node 104(1-N) has a host bus adapter (not shown) to enable communication using FCP protocol layered over FC protocol to FC switch 103 in a dedicated fashion. For example, each connected host that will be backing up data has a separate optical data line 105a in this example connecting that node to a port 105b on switch 103. Some modes may have more than one HBA and may have multiple lines and ports relevant to switch 103. For the purpose of example, assume 64 hosts and therefore 64 separate optical links (Fiber Optic) connecting the hosts to switch 103. In another embodiment however the lines and splitters could be electrical instead of optical.

FC switch 103 has ports 106B and optical links 106A for communication with primary storage media (D1-DN). Fabric in switch 103 routes data generated from certain hosts 104(1-N) in DPN 100 to certain disks D1-DN for primary data storage purposes as is known in RAID architecture. Data is stored in volumes across D1-DN according to the RAID type that is applied. Volumes may be host segregated or multiple hosts may write to a single volume. D1-DN are logically viewed as one large storage drive. If one host goes down on the network, another host may view and access the volume of data stored for the down host. As is known, under certain RAID types some of the disks store exact copies of data written to primary storage using a technique known as data striping. Such storage designations are configurable.

There will likely be many more ports on the north side of FC switch 103 (facing LAN hosts) than are present on the south side of FC switch 103 (facing primary storage). For example, each host node may have a single HBA (SCSI controller). Each physical storage device connected to SAN network 109 has a target device ID or SCSI ID number, each of which may be further divided by an ID number referred to in the art as a logical unit number (LUN). In some cases a LUN, or device ID number can be further broken down into a sub-device ID or sub logical unit number (SLUN) although this technique is rarely used. In prior art application when a host node, for example node 104(I), writes to primary storage; the actual write data is transmitted to one of ports 105B over the connected fiber optic line 105A.

From port 105B the data is routed to one of ports 106b and then is transmitted to the appropriate disk, D1, for example. FC transport protocols, including handshake protocols are observed. All data written from host I, for example, to primary storage D1 comprises data that is typically stored in the form of data blocks. Data generated by hosts is typically written to primary storage in a buffered fashion for performance reasons, however most systems support unbuffered writes to primary storage for reliability reasons. At the end of a work period, data and the changes to it that have been stored in primary storage disks D1-DN may be transferred or copied to longer-term tape media provided by tape drive 108. Operating node 107, an administrator copies data from D1-DN and writes the data to tape drive 108.

Each host sends over the data and or its changes for one or more volumes. The data changes have to be computed before they can be sent as they are not tracked continuously, therefore, backup operations are typically performed in batch mode, queuing volumes and or files for one or more hosts, and so on until all hosts 104(1-N) have been completely backed up to tape media. Each node has a backup window or time it will take to completely preserve all of the data that previously existed and/or the changes that particular node generated in the work period.

Typical time windows may range from 30 minutes for a PC to up two 2 days or more for a robust data server. An administrator must be paid to oversee the backup operations and in the case of large servers backup jobs may be ongoing taking all of the administrator's time. One goal of the present invention is to eliminate the batch mode archiving requirements of data storage and recovery systems. A solution to the manual process can save considerable time and resource.

Figure 2:
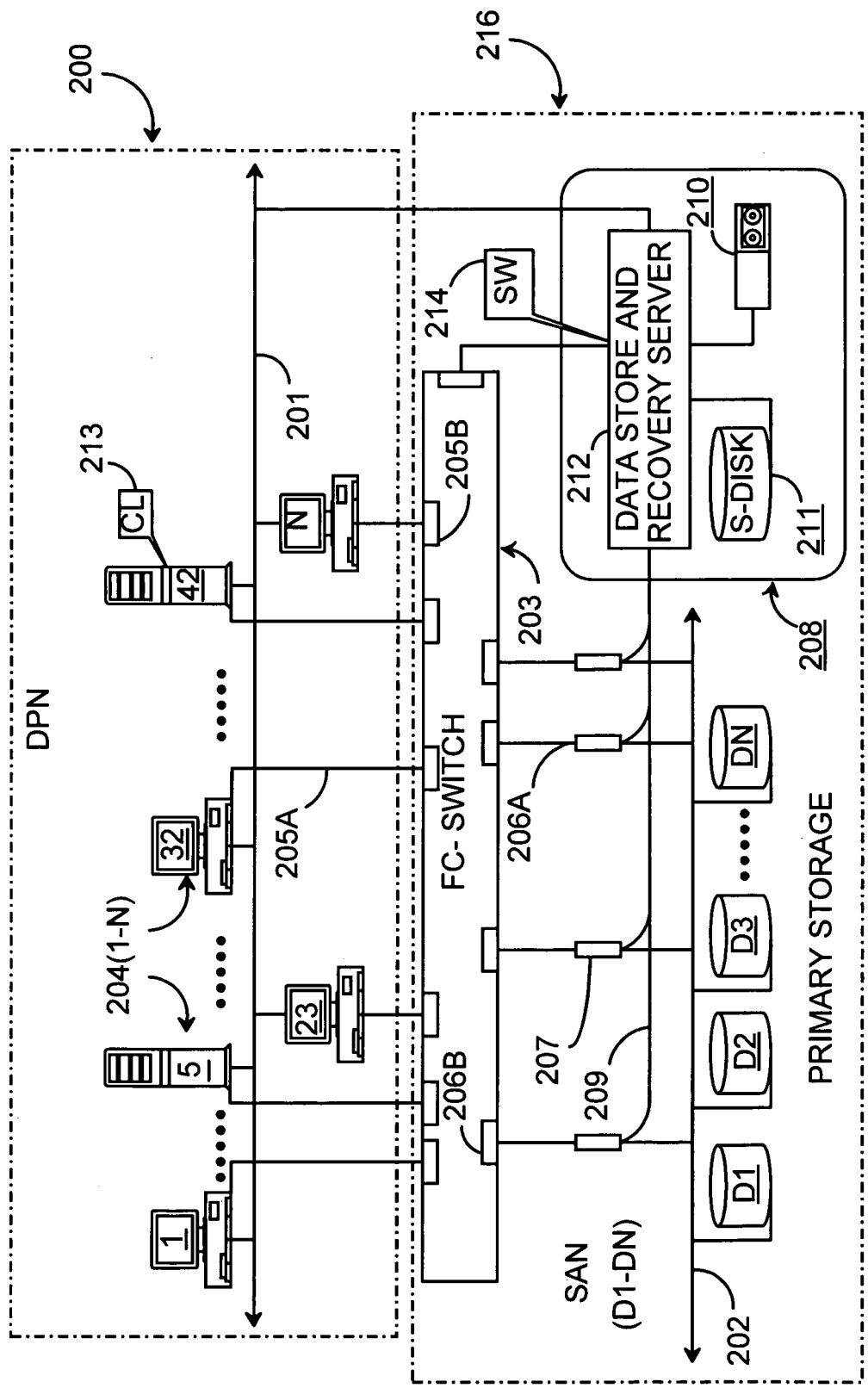
FIG. 2 is an architectural overview of a SAN-based data storage and recovery network according to an embodiment of the present invention.

FIG. 2 is an architectural overview of a SAN-based storage and recovery network according to an embodiment of the present invention. A DPN 200 is illustrated in this embodiment. DPN 200 may be an Ethernet LAN, TCP/IP WAN, or metropolitan area network (MAN), which may be a wireless network. For purpose of discussion assume that DPN 200 is a network similar in design and technology to that of LAN domain 100 described above with references to FIG. 1. An exception to the similarity is that there is no tape drive system or a connected administrator node for controlling tape archiving operations maintained on the north side of the architecture.

LAN domain 200 is further defined in this embodiment by LAN cable 201 providing a physical communication path between nodes 204(1-N). LAN domain 200 may hereinafter be referred to as LAN 201 when referring to connective architecture. Nodes 204(1-N) are illustrated as connected to SAN-based FC switch 103 via optical paths 205A and ports 205B mirroring the physical architecture described further above. The SAN network is identified in this example as SAN 216. In this example, nodes I-N each have an instance of client software (CL) 213 defined as a client instance of a secondary data storage and recovery server application described later in this specification. Nodes 204(1-N) in this example are a mix of PC-based and robust servers that may work in dedicated standalone mode and/or in cooperative fashion to achieve the goals of the enterprise hosting the LAN. For example, server 5 may be an email server and server 42 may be an application server sharing duties with one or more other servers. A common denominator for all of nodes 204(1-N) is that they all, or nearly all, generate data that has to be backed up for both near term and long-term recovery possibilities in the event of loss of data. Nodes 204(1-N) may or may not be equipped with direct access storage (DAS) drives.

Nodes 204(1-N) have dedicated connection paths to SAN FC switch 103 through optical cables 205A and FC ports 205B in a typical architecture. In one embodiment of the present invention high-speed copper wiring may be used in place of fiber optic links. However in a preferred embodiment, the faster technology (fiber) is implemented. The exact number of nodes 204(1-N) is arbitrary, however up to 64 separate nodes may be assumed in the present example. Therefore, there may be as many as 64 cables 205A and 64 ports 205B on the north side of FC switch 103 in the SAN connection architecture.

Ports 205B on the north side may be assumed to contain all of the functionality and components such as data buffers and the like for enabling any one of nodes 201(1-N) to forge a dedicated connection for the purpose of writing or reading data from storage through FC switch 103. Ports 205B are mapped through the FC fabric to south side ports 206B. Ports 206B are each configured to handle more than one host and number less than the LAN-side ports 205B. One reason for this in a typical architecture is that a limited number of identifiable storage devices are supported on SAN domain 216, which is further defined by network cable 202.

SAN domain 216 may also be referred to herein as SAN 202 when referring to physical connection architecture. D1-DN may number from 2 to fifteen devices in this example; however application of LUNs can logically increase the number of "devices" D1-DN that may be addressed on the network and may be written to by hosts. This should not be considered a limitation in the invention.

SAN 202 is connected to ports 206B on FC switch 103 by way of high-speed optical cabling (206A) as was described further above with reference to FIG. 1 with one exception. A secondary storage sub-system 208 is provided in one embodiment to operate separately from but having data access to the SAN-based storage devices D1-DN. In a preferred embodiment System 208 includes a data-storage and recovery server 212 and at least one secondary storage medium (S-Disk) 211, which in this example, is a DAS system adapted as a SATA drive. In one embodiment disk 211 may be a PATA drive. In this example, server 212 is a dedicated node external from, but directly connected to storage disk 211 via a high-speed data interface such as optical cable. In one embodiment of the present invention server 212 may be PC-based running server and storage software. Disk 211 is, in this example, an external storage device or system however, in another embodiment, it may be internal. In one embodiment of the present invention disk 211 may be logically created or partitioned from the primary storage system including D1-DN on SAN 202. There are many possibilities.

Server 212 has a SW instance 214 installed thereon and executed therein. SW 214 is responsible for data receipt, data validation, data preparation for writing to secondary storage. SW 214 may, in one embodiment, be firmware installed in distributed fashion on line cards (not shown) adapted to receive data. In another embodiment, SW 214 is a mix of server-based software and line card-based firmware. More detail about the functions of instance 214 is given later in this specification. Server 212 has a direct connection to FC switch 103 in this example and with some configuration changes to the FC switch 103 and or the primary storage system including D1-DN has access to all data stored for all hosts in D1-DN over SAN 202 and through the FC fabric. In this example, server 212 also has a direct LAN connection to LAN 201 for both data access and data sharing purposes and for system maintenance purposes. Server 212 can read from primary storage and can sync with primary storage in terms of volume data location offsets when booted up.

However server 212 stores data differently from the way it is stored in primary storage. System 208 includes a tape drive system 210 for archiving data for long-term recovery and storage. System 208 is responsible for providing a secondary storage medium that can be used independently from the primary storage D1-DN for enhanced near-term (disk) and long-term (tape) data backup for hosts 204(1-N) operating on network 201. In this example, data written from hosts to primary storage (D1-DN) is split off from the primary data paths 206A (optical in this example) defining the dedicated host-to-storage channels. This is achieved in this example using a data path splitter 207 installed, one each, in the primary paths on the south side of FC switch 103 in this example. In this way system 208 may acquire an exact copy of all data being written to primary storage.

Data mirrored from the primary data paths is carried on high-speed fiber optics lines 209, which are logically illustrated herein as a single data path in this example for explanation purposes only. In actual practice, server 212 has a plurality of line cards (not shown) installed therein; each card ported and assigned to receive data from one or more splitters.

In one embodiment, data path splitting is performed on the north side of FC switch instead of on the south side. In this case more splitters would be required, one for each data path like 205A. The decision of where in the architecture to install splitters 207 is dependent in part on the number of hosts residing on LAN 201 and the amount of overhead (if installed on the south side) needed to efficiently keep track of source and destination addresses for each frame carrying payload data passing the splitters.

Data is transparently split from primary host paths for use by server 208 to provide enhanced secondary data storage and recovery that greatly reduces the work associated with prior-art operations. Server 212, with the aid of SW 214 provides data storage for hosts onto disk 211 and automated archiving to tape media 210 in a continuous streaming mode as opposed to periodic data back up and tape-transfer operations performed in prior art systems.

In one embodiment WAN data replication may be practiced instead of or in addition to tape archiving. For example, hosts 204(1-N) may be WAN-connected or WAN-enabled through a gateway. Data from disk 211 may be replicated for recovery purposes and sent over the WAN to a proxy system or directly to hosts. The data may be sent in pass through mode (lower level) where there are no application consistency features applied. In one embodiment recovery data may be replicated and sent to hosts in a time shot mode wherein application consistency measures are applied to the data.

In practice of the present invention according to the exemplary embodiment illustrated, a host, say host 5 for example, performs a save operation to a database. The save operation is considered a data write to primary storage. When the data hits splitter 207 after routing has been assigned to the appropriate storage device D1-Dn by FC switch 103, an exact copy is mirrored from the splitter (207) to server 212. Server 212 receives the data inline via dedicated line interface and performs in some embodiments unique data optimization techniques before writing the data sequentially to secondary disk 211.

In an alternate embodiment mirroring data from the primary paths of the hosts may be performed within FC switch 103; however modification of switch hardware would be required. Splitting data from either the north side or the south side of switch 103 can be performed using off-the shelf hardware requiring no modification to FC switch 103. In the physical link layer of the FC protocol model there is no discernable difference in splitting data at the north or south side of FC switch 103, however in subsequent protocol layers the characteristics thereof provide some motivations for performing data splitting, optimally, on south side of FC switch 103. Likewise, data may be split at the location of each host 204(1-N) using similar means. In still another embodiment server 212 may wait and read any new data after it has been written to primary storage. However in this case, an overhead would be created comprising the number of extra reads performed by server 212.

Splitting the data from primary data paths provides the least intrusive or passive method for obtaining the required data for secondary storage. Host machines 204(1-N) may have an instance of client SW (CL) 213 installed thereon and executable there from. CL 213 cooperates with SW 214 running on machine 212 to optimize data writing to secondary storage by helping to reduce or eliminate redundant data writes. Data storage and recovery server 212 keeps a database (not shown) of metadata describing all data frames received that are considered writes (having payloads for write) and optionally reads, the metadata describes at least the source address (IP or MAC), destination address, (LUN), frame sequence number, offset location, length of payload, and time received of each data frame that is copied thereto from the primary data paths from hosts 204(1-n) to primary storage (D1-DN).

The metadata is used to validate write data. The technique is for ensuring against any data loss theoretically possible due to the split and lack of flow control that it implies. It also is used for reducing or eliminating secondary storage of redundant writes and requires cooperation, in one embodiment from hosts 04(1-N) running instances of CL 213. In this way redundant writes, for example, of the same data whether created by a same or by separate hosts are not processed by server 212 before data is written to disk 211. Same writes by separate hosts are instead presented as one write identifying both hosts. CL 213 in the above-described embodiment has a utility for creating the metadata descriptions for each pending write performed by the host server or PC. At each write, server 212 receives both the actual data and the associated metadata. The metadata for a set of received write frames is compared with metadata formerly acquired by server 212.

A hit that reveals a same data checksums, length, order and other parameters for a payload indicates a redundant write or one where the data has not changed. More detail about this unique optimization technique is provided later in this specification. Other techniques used by server 212 include the use of a sparse file utility as one layer of one or more compression techniques to optimize the speed of secondary storage to match that of primary storage devices and to facilitate faster data recovery to hosts in the event that it is required. Sparse file technology is based on avoiding storing of unused data blocks. Storage is more efficient because no physical storage space is allocated for portions of the file that do not contain data.

In a predefined embodiment of the present invention, server 212 facilitates writing to secondary data storage in near real time in significantly larger sequential streams than would be possible if the input data itself were written per its normal characteristics. Also in a predefined embodiment of the invention stored data aging past a reasonable time window, perhaps 30-120 days, is archived to tape or other long-term storage media in an automated fashion per flexible policy settings. In still another enhancement to the way data is stored, server 212 is adapted in a preferred embodiment to write data to disk 211 is a sequential fashion instead of a random fashion as is the typical method of prior-art data store mechanics. In still another preferred embodiment any data that is older than a reasonable and configurable time window will be securely and automatically purged. The system of the present invention enables a client to allocate more disk space for primary storage and eliminates periodic data backup and archiving operations. In addition, data recovery back to any requesting host can be performed in a file-based, volume-based, or application-based manner that is transparent across operating systems and platforms. Still another benefit is that secondary storage space can be less than that used for primary storage or for normal secondary disks maintained in primary storage because of data compression techniques used.

One with skill in the art of network-based data storage will recognize that secondary storage system 208 may be provided as a CPE hardware/software system or as a CPE software solution wherein the client provides the physical storage and host machine for running the server application software. In one embodiment, system 208 may be provided as a remote service accessible over networks such as other LANs, MANS. WANs or SAN Islands. In the latter case, instead of using physical path splitters, the system may access data directly from the primary storage system before writing to secondary storage. Some overhead would be required for the extra read operations performed by the system. In a preferred embodiment, the system is implemented as a CPE solution for clients. However that does not limit application to clients using a WAN-based SAN architecture of storage network islands. System 208 is scalable and can be extended to cover more than one separate SAN-based network by adding 110 capability and storage capability.

Figure 3:
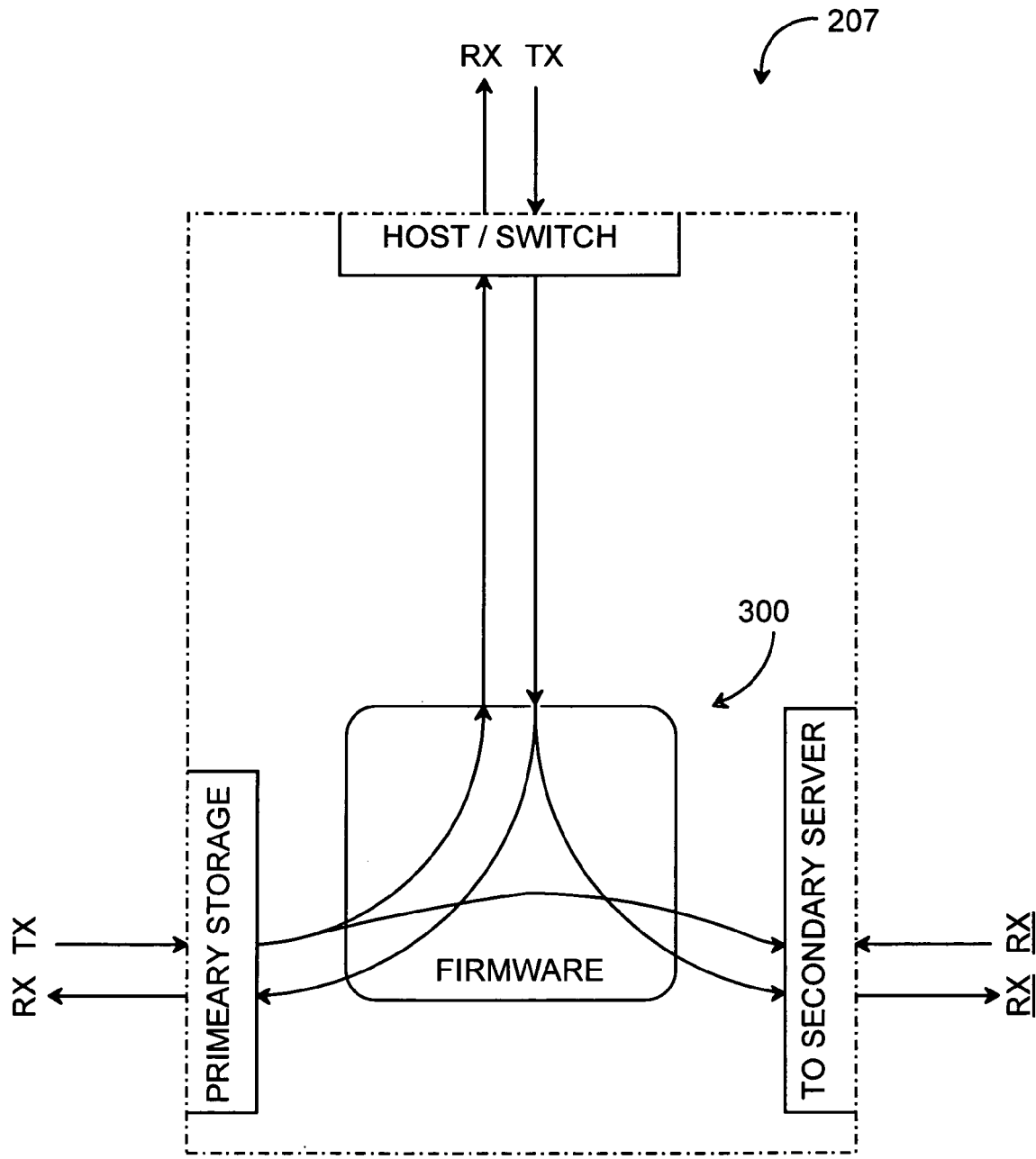
FIG. 3 is a block diagram illustrating data path splitting in the architecture of FIG. 2.

FIG. 3 is a block diagram illustrating data splitting as practiced in the architecture of FIG. 2. Data splitter 207 is in this example is an off-the shelf hardware splitter installed into each primary data path from a host/switch to the primary storage system. As such, splitter 207 has an RX/TX port labeled From Host/Switch, an RX/TX port labeled To Primary Storage, defining the normal data path, and an RX/RX port labeled To Secondary Server, leading to server 212 described with reference to FIG. 2 above. In a preferred embodiment each optical cable has two separate and dedicated lines, one for receiving data sent by the host/switch and one for receiving data sent by the primary storage subsystem. The preponderance of data flows from the switch in this example to primary storage and thereby to secondary storage. Normal FC stack protocol is observed in this example including the Request/response protocol for initiating and concluding a transaction between a host and a primary storage destination. Firmware 300 is illustrated in this example and includes all of the functionality enabling exact copies of each data frame received at the switch-side port and destined to the primary storage port to be split onto the secondary server side port.

In this configuration both the primary storage and secondary storage systems can theoretically communicate independently with any host configured to the FC switch. Referring back to the example of FIG. 2, data mirroring to secondary storage may, in one embodiment, only be performed on the stream that is incoming from a host and destined to primary storage. However in another embodiment server 212 "sees" all communication in both directions of the primary data path hosting a splitter 207. In this way, server 212 can insure that an acknowledgement (ready to receive) signal of the FC handshake has been sent from primary storage to a requesting host so that server 212 "knows" the write has been successful. In this embodiment, no data writes are mirrored to secondary storage if they are not also written to primary storage. In still another embodiment all data from a host to primary storage may not be split to secondary storage. In this embodiment firmware at the splitter is enhanced to mirror only data frames that include a payload or "write data" and, perhaps an associated ACK frame. In this was unnecessary data frames containing no actual write data do not have to be received at server 212. Logical cable 209 represents a plurality of separate fiber optics lines that are ported to Line Cards (not shown) provided within server 212. More detail about line communication capability is provided later in this specification.

Figure 4:
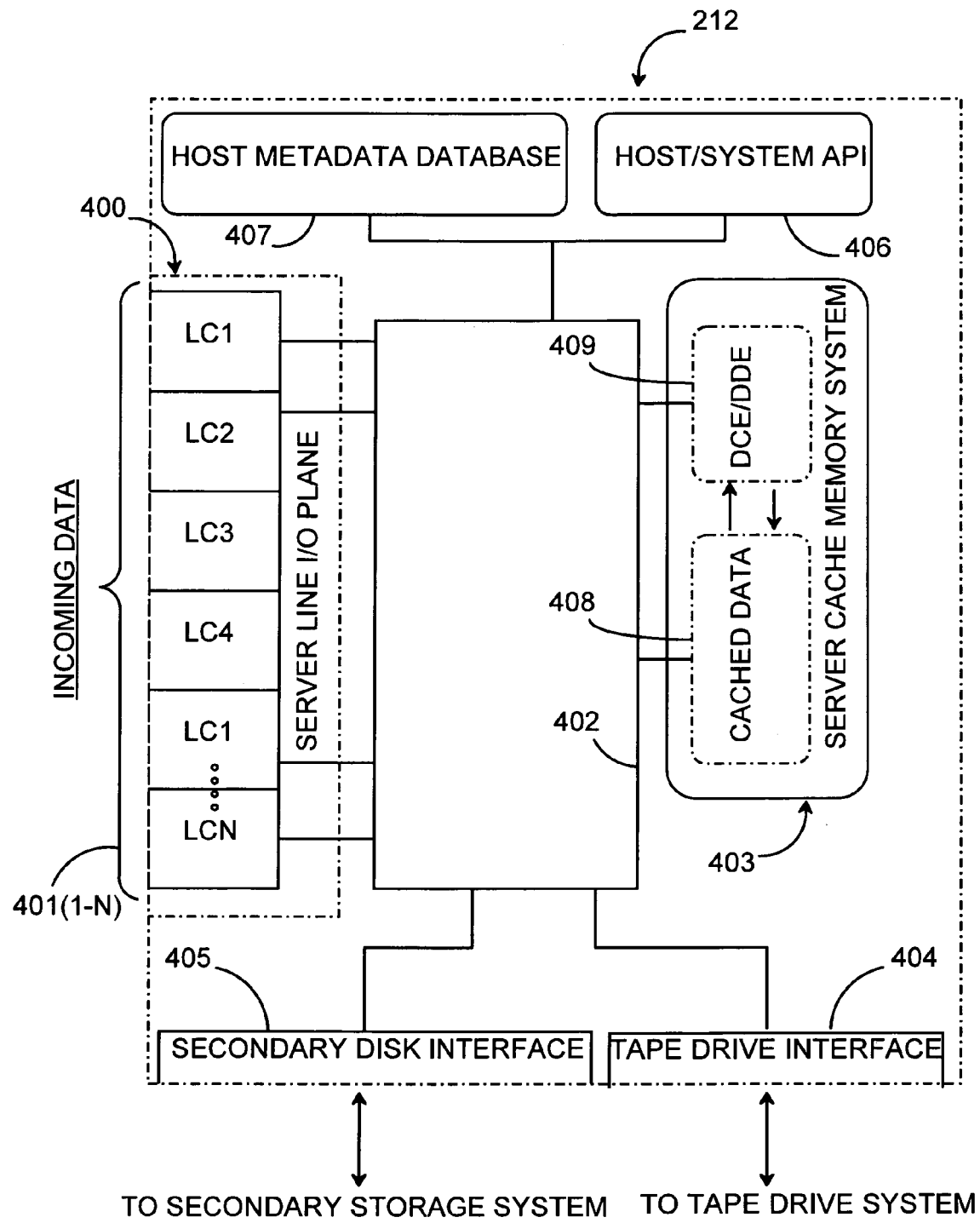
FIG. 4 is a block diagram illustrating components of the secondary storage and recovery server of FIG. 2 according to an embodiment of the present invention.

FIG. 4 is a block diagram illustrating components of secondary storage and recovery server 212 of FIG. 2 according to one embodiment of the present invention. Server 212 is, in this example, a dedicated data server node including just the hardware and software components necessary to carry out the Functions of the present invention. Server 212 has a bank of line cards 400 including line cards (LC) 401(1-N). Each line card 401(1-N) has at least two RX ports and two possibly inactive TX ports configured to receive data from the assigned splitter or splitters 207 described with reference to FIG. 2 above. In one embodiment, one or more line cards 401(1-N) may be dedicated for communication with FC switch 103 for the purpose of control signaling and error signaling and, perhaps direct communication with any host that is configured to FC switch 103.

In one embodiment of the present invention line cards 401(1-N) may include a mix of standard HBAs that engage in two way data transfer and special dedicated cards provided by the inventor and adapted primarily only to receive incoming write data and to offload that data into a cache system represented herein by cache system 403. Each line card 401(1-N) that is adapted to receive copied data from hosts has assigned to it the appropriate FC port (206B) including identified hosts (204)(1-N) that are assigned to the covered port for communication. The overall data load could be, in one embodiment, balanced among the available line cards 401(1-*n*). Server 212 has a high-speed server bus logically represented herein as bus structure 402. Bus 402 connects all necessary components together for communication within the server and to external components. A communication bus controller is not illustrated in the example, but may be assumed to be present. Each line card 401(1-N) has a direct link to a server cache memory system 403 over logical bus 402. All data received on line cards 401 (1-N) that is considered read/write data is cached in one embodiment in cache memory system 403, the data represented herein by a block 408 labeled cached data. Data buffers and other components of cache system 403 and line cards 401(1-N) are not illustrated but may be assumed to be present. More detail about a unique line card adapted for receiving data for secondary storage is provided later in this specification. Server 212 has an I/O interface 405 to an external secondary storage disk or disk array analogous to storage disk 211 described with reference to FIG. 2 above. I/O interface 405 includes all of the necessary circuitry for enabling data writing to secondary storage from cache system 403 on a continuous streaming basis as data becomes available.

In one embodiment data cache optimization is performed wherein redundant frames including read requests and, in one embodiment, redundant writes are deleted leaving only valid write data. In a preferred embodiment, elimination of redundant writes is a line card function physically carried out on designated cards 401(1-N). In one embodiment the line cards 401(1-N) can write directly to the secondary storage through the I/O interface 405 using a shared file system module provided for the purpose. Server 212 has an I/O interface 404 to an external tape drive system analogous to tape drive system 210 described with reference to FIG. 2 above. Interface 404 includes all of the necessary circuitry for enable continuous writes to tape according to data availability for archiving long term storage data.

In one embodiment the I/O interfaces 404 and 405 can be one and the same. Server 212 includes a host/system application program interface (API) 406 adapted to enable communication to any LAN-connected host bypassing the FC architecture over a separate LAN communication link analogous to link 215 described with reference to FIG. 2. Interface 406 may, in one embodiment, be used in data recovery operations so that recovery data does not have to be conducted through a primary host-to-storage data path exclusively. Server 212 also has internal storage memory 407, which in this case is adapted to store metadata about data frames that are written to secondary storage and used by certain LCs 401(1-N) to validate that a particular write carries data that has changed from a last data write to related data. The metadata includes but is not limited to host ID, a destination ID (LUN ID), an offset location in primary storage allocated for the pending write, and the length value of the payload.

Host nodes 204(1-N), in one embodiment create the metadata sets with the aid of CL instance 213 described with reference to FIG. 2 when frames having write payloads are packaged for send through FC switch 103 to primary storage. The metadata can be sent either through the SAN or the LAN and is received at server 212 after the associated data frames. Each metadata set received is compared at least by payload length, and offset location to metadata sets previously received from a same host during a work period. Server 212 may, in one embodiment create hash values of metadata fields for use in a data search of a centrally located database containing all of the host metadata.

In this embodiment the CL instance 213 may also create a hash value from the metadata set and exchange it with Server 212 as a faster way of matching metadata sets. A hit, as described further above, indicates that the pending write as a duplicate payload already stored for the originating host or for another host or hosts. In this embodiment, redundant write frames can be eliminated onboard a LC without consulting database 407. For example, a limited amount of metadata may be retained for a specified period after it is received to any line card 401. This near-term metadata on a single line card describes only the data writes previously performed by hosts that are configured to the data path of that card. Metadata on other cards describes data sent by the hosts configured to those cards.

In another embodiment, metadata about data writes is generated at a line card analogous to the one described further above as the data is received from splitter 206A instead of at the host. In this embodiment, the generated metadata is immediately compared with previously generated and stored metadata either on board or in conjunction with an off-board database. Although not preferred, it is possible to send generated metadata lists to LAN hosts so that metadata generated at a LAN host can be compared locally before writes are completed.

In this aspect redundant saves may be prevented from entering the primary data path. In a preferred embodiment only change data written and sent for write from hosts 204(1-N) to primary storage is stored in secondary storage. In this embodiment data changes are also held separately as revisions from previous changes to a same volume of data. The purpose of this is to provide revision selectable and time-based recovery of data. In prior art systems old data is typically overwritten by new data including the change data and recovery is limited to recovery of the latest saved version of any data file.

Data changes are stored in disk 212 separately but linked to the relevant data block or blocks that the new revisions or versions apply to. Each time a new revision of data is recorded, it is also time stamped so that a host wishing to recover a specific version of a file, for example can select a desired time-based version or versions of a single file. In this way no data is lost to a host machine because it was over written by a later version of the same data. Cache system 403 has a data compression/decompression engine (DCEDDE) 409 provided therein for the purpose of compressing data before writing the data to secondary storage disk (211). In a preferred embodiment write data is prepared with a sparse file utility and then compressed before writing the data sequentially to storage disk 211. This technique enables more disk area to be utilized and with sequential storage, enables faster retrieval of data for recovery purposes. In one embodiment the DCEDDE can be embedded with the line cards 401(I-N).

In one embodiment, when data is served to one or more hosts during near term recovery (up to 30 days) it may be retrieved and served in compressed format. CL 213 running on host machines may, in this case, be adapted with a decompression engine for the purpose of decompression and access to the recovered data locally. This embodiment may be practiced for example, if volume recovery is requested over an IP connection or across a LAN network. In one embodiment, data streamed to tape drive (211) is decompressed and rendered in a higher-level application file format before transfer to storage tape for long-term archiving. In a preferred embodiment, data offload to tape is an automated process that runs on a schedule that may consider the amount of time data has remained in secondary storage. In another embodiment tape archiving is triggered when a physical storage limit or a time based policy condition has been reached.

Figure 5A:
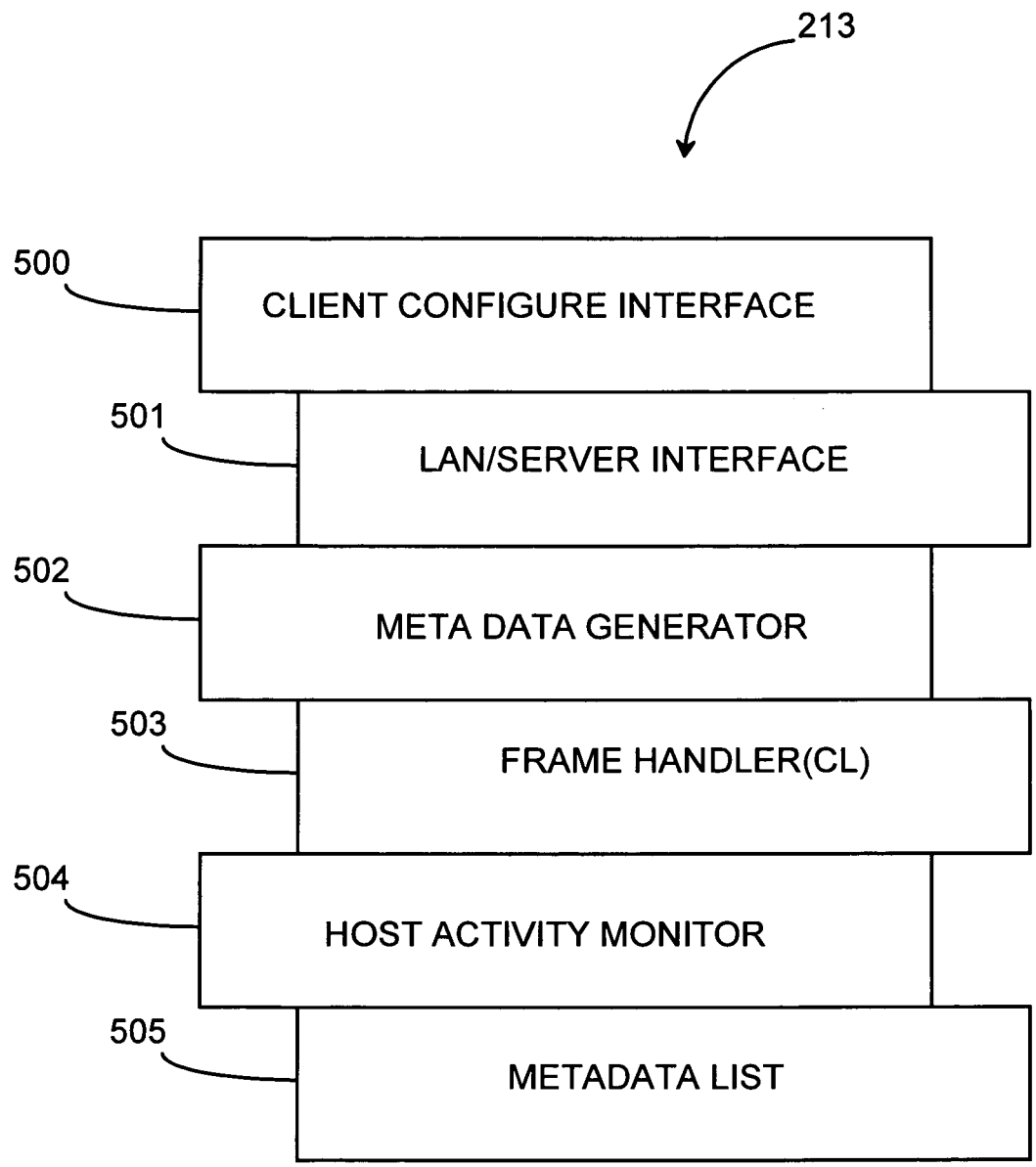
FIG. 5A is a block diagram illustrating client SW components of the SW of FIG. 2 according to an embodiment of the present invention.

FIG. 5A is a block diagram illustrating client SW components of client 213 of FIG. 2 according to an embodiment of the present invention. CL 213 has a client configure interface 500 enabling a LAN or remote network connection to and communication with server 212 described with reference to FIG. 4 for purpose of configuring a new LAN host to the system. This interface may be of the form of a Web browser interface that may also include a remote LAN to server interface 501 for manual configuration. Any LAN host may be configured or through an intermediate server as to what type and scope of data backup the host will practice. This consideration may very according to task assignment from backup of all generated data to only certain types of critical data. In one less preferred embodiment CL 213 has a shared metadata list 505 for the purpose of checking if pending writes that may be redundant writes.

In another embodiment a metadata-generating utility 502 is used to create metadata descriptions of each pending write that has been approved for the host. In this case, the metadata are associated to the frames containing the payload data and sent with each physical data frame by a frame or file handler 503. In another embodiment metadata generated is sent to the system host server (212) via LAN, bypassing the FC switch (193). SW 500 may include, in one embodiment, a host activity monitor 504 that is provided and adapted to monitor host activity including boot activity and task activity.

It may be that a host is running more than one application simultaneously and saving data generated by the separate applications as work takes place within the host. Monitor 504 is responsible for spawning the appropriate number of metadata generation utility instances 502 for the appropriate tasks occurring simultaneously within the host if the host is configured to generate metadata. In another embodiment, CL SW 500 is kept purposely light in terms of components, perhaps only containing a configure interface, a LAN to server link, and an activity monitor. In this case the application and OS of the LAN host works normally to save data changes and the metadata is generated and compared on the server side of the system. There are many possibilities.

Figure 5B:
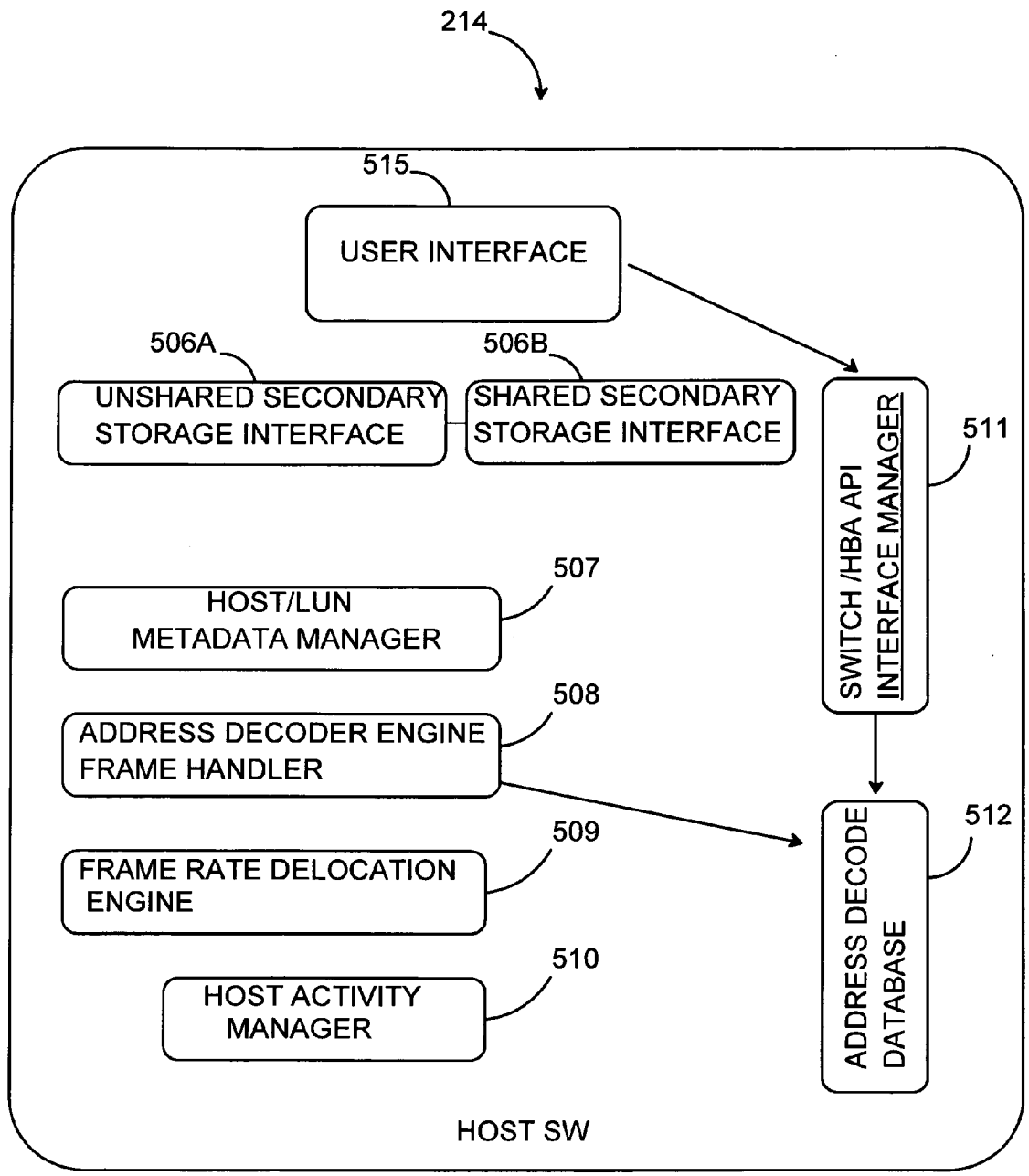
FIG. 5B is a block diagram illustrating components of the host SW of FIG. 2 according to an embodiment of the present invention.

FIG. 5B is a block diagram illustrating components of host SW 214 of FIG. 2 according to an embodiment of the present invention. SW 214 may be a mix of server software and line card firmware without departing from the spirit and scope of the present invention. SW 214 has a user interface 505 adapted for enabling remote configuration of LAN or WAN host machines that will have data backed up to near and long-term storage.

Interface 505 can be accessed via LAN or WAN connection and in some embodiments through a master server or intermediate server acting as a master server for distributed system sites. SW 214 has a switch HBA API interface 511 for enabling communication between the system (server 212) and an FC switch analogous to switch 103. In one embodiment interface 511 may be adapted for interface to an Ethernet switch. SW 214 has a pair of secondary storage interfaces 506A and 506B, which are optionally adapted to enable either shared write capability or unshared write capability to secondary storage from the server. Interface 506A is optional in an embodiment wherein one or more specially adapted line cards in the server are enabled to compress and write data directly to secondary storage from an onboard cache system thereby bypassing use of a server bus. In this case unshared implies that each line card adapted to write data to secondary storage may do so simultaneously and independently from one another.

In one embodiment all data writes to secondary storage are performed by the host server from a server cache memory. In this case interface 506B (shared) is used. All line cards adapted to send data to secondary storage in this case send their data onto a PC1 or other suitable type of server bus (shared) into a server cache memory from whence the data is compressed and then written into secondary storage (disk 211). SW 214 has a host/LUN metadata manager utility 507 adapted either as a piece of software running on the server, or as distributed instances of fm ware running on line cards responsible for writing or sending their data for write into secondary storage. Manager utility 507 functions in one embodiment to compare metadata about physical data received in line with previous metadata sent from a same host to check for redundant writes against the same host and against writes performed by other hosts as well. In this way only valid changes are secured to the secondary storage media.

In another embodiment manager utility 507 is also adapted to generate metadata for comparison from data received from the data splitting junction for each line card. In this embodiment, the generated metadata is immediate compared with host metadata either onboard the line card or in conjunction with a server database containing a specific amount of metadata from all configured hosts. In one embodiment metadata is received at the server from hosts via LAN or WAN link and is not received by a line card from the FC switch.

In this case the line card is adapted only to receive data from the split in the designated primary data path between a host and primary storage. Metadata lists generated at host machines can be exchanged periodically with server 212 offboard from line cards. SW 214 has a frame handler with an address decoder engine 508 adapted, in a preferred embodiment as firmware installed on line cards adapted to receive data changes from host machines through the suitable split data path.

Utility 508 works in conjunction with a configurable address decode database 512, which is adapted to retain host machine address information such as IP or MAC address depending on the network protocol used. Decode database 512 is populated through user interface 505 and interface manager 511. Configuration then provides both the home network information of a host and the FC or Ethernet port assignments and splitter address (if required). Decoder engine 509 is responsible for decoding incoming data frames so that payloads for write may be properly identified. LUN destination, source destination, payload length, timestamp information, splitter ID (if required), and other information is provided from decoding incoming frames.

In one embodiment of the present invention, SW 214 has a frame rate detection engine 509 adapted as a distributed firmware component installed on each line card adapted for backup duties. The purpose of detecting frame rate is to enable proper adjustment of buffer load and speed according to the actual data speed over the link. A host activity manager 510 is provided and adapted to log host activity reported by a client component residing on the host or by actual data activity occurring on a line card assigned to the host. Software 214 may contain additional components not mentioned in this example without departing £tom the spirit and scope of the present invention. Likewise some components illustrated may not be required such as the host activity manager 510, or one of the secondary storage interface types. SW 214, in a preferred embodiment, resides at least partially in the form of distributed firmware on special line cards provided by the inventor and dedicated to receive and process data incoming from the primary data path via optical splitter.

Figure 6:
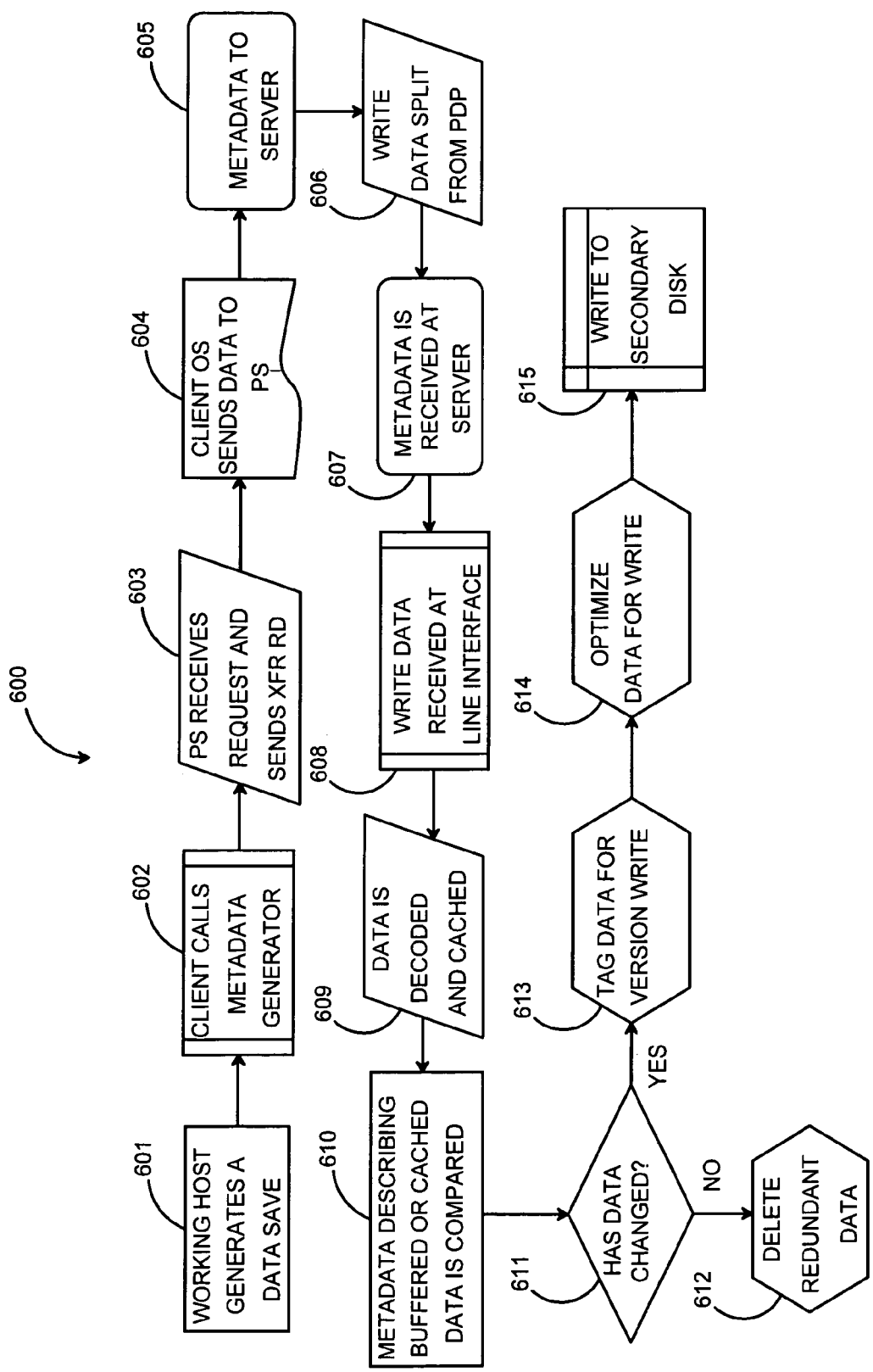
FIG. 6 is a flow chart illustrating a process for writing data to secondary storage according to an embodiment of the present invention.

FIG. 6 is a flow chart 600 illustrating a process for sending change data and writing the change data to secondary storage according to an embodiment of the present invention. At step 601a LAN host analogous to one of hosts 204(1-N) described above generates a data save operation (s). It will be appreciated by one with skill in data transfer that data sent from any host is sent as soon as it is physically "saved to disk" at the host.

In one embodiment, replication is preformed if the host uses a local drive but is configured to send data changes through the FC switch to PS. At step 602, in one application, metadata describing parameters of the change data are generated by the client SW (213). CL 213 is configured to consider that each save operation performed by a host is a potential data write to primary storage although at this point it is not clear that it is a write containing change data. Therefore, each save made by an application working with files or other data whose data is to be backed up, is considered a write request, which must be initiated from the point of a host and must be acknowledged by the primary storage system before any writes are actually sent.

At step 603, the primary storage system receives a request from the client OS and sends an XFER RD (equivalent to acceptance of the request) back to the OS to get ready for the data transmission over the primary data path. It is noted herein that the request and confirmation of the pending transmission are visible on the assigned line card designated to receive data split from the primary data path (PDP).

In one embodiment of the present invention wherein the secondary storage system (208) is remote from the operating LAN or WAN over IP, data replication is used over IP tunneling protocols or other suitable transport protocols to send the exact data copies of data generated by one or more hosts to the secondary storage system server. At step 604, the host, or client OS then sends the data over the PDP. The transmission is responded to by acknowledge and completion status packets. In one embodiment, these packets are used by server 212 to guarantee fidelity of writes to the secondary storage system by making sure that the writes to primary storage (PS) actually happened before storage space is allotted and writes are committed to the secondary storage.

In one embodiment, at step 605 CL (213) residing on the sending host generates metadata describing frames carrying a payload for write during a session with primary storage. The metadata describes aspects of the actual data frames it is associated with. For example, the host ID on the LAN and the destination device ID or LUN number is described. The offset position allocated by primary storage (received in ACK) is described. The frame sequence numbers are described, and the actual length of the data payload of the frame or frames is described. At step 605, the metadata, if generated by the client, is preferably sent over LAN, WAN, or other link to server 212 and not over the PDP between the client machine and the PS system. The metadata of step 605 may describe all of the data "saved" and not just the changed data (if any). Moreover, the metadata may be continuously or periodically shared with server 212 from the client 0s. The metadata is compared to previous metadata generated by the client to isolate "changed data" received at the server line interface.

In another embodiment metadata is not generated in step 602 or sent to server 212 in step 605, rather, metadata is generated at server side, more particularly at the specific line interface receiving the data split from the PDP. In this case change data is isolated at server side by comparing recent metadata against a metadata database. Metadata "hits" describing a same LUN, payload length, source address, offset location, etc., are considered redundant writes or duplicate writes that contain no new information.

In this way processing is reduced. At step 606, the data sent over the PDP by the client machine is transparently split from the path onto a path leading to server 212 and a receiving line card. It is noted herein that data frames having no payload and therefore not considered a potential write may be ignored from the perspective of secondary storage caching.

At step 607, the latest metadata describing the saved data is received at server 212 either in server cache, or in one embodiment, to a special memory allocated for the purpose. In another embodiment the metadata may be routed through the server to the appropriate line cad that received the latest "save" data from the same client machine. At step 608, data split from the PDP is received at the appropriate line interface. It is possible that a single line interface will process frames from multiple client machines. Proper frame decoding is used to identify and segregate data frames. At step 609 data received at step 608 is decoded and cached. Data caching may involve offloading into a server cache.

In one embodiment data caching may be performed onboard the line interface wherein the line interface has a capability for writing directly to secondary storage as described further above. In the latter case metadata comparison may also be performed onboard without using server resources. The metadata database could be carried onboard to a limited extent. In either embodiment (line card based; server cache based), at step 610 the metadata describing the latest "save data" for the client is compared against previous metadata stored for the client.

The comparison "looks" for hits regarding source ID, LUN ID, payload length; checksums value, and offset location allocated for PS to identify redundant frames or frames that do not contain any changed data in their payload portions. At step 611 the system determines for the preponderance of frames cached for write whether data has actually changed from a last "save" operation performed by the client. For each frame payload, if data has not changed then the data is purged from cache and is not written to secondary storage in step 612.

At step 611 if it is determined for any frames that the payload has changed (is different), then at step 613, those data units are tagged for write to secondary storage. At step 614, those data units of the "save session" that are considered valid writes reflecting actual changed data are further optimized for storage by using a sparse file utility to create sparse files for saving storage space and faster near-term data recovery along with a compression algorithm to further compress the data. At step 615 the data is sequentially written to the secondary storage media analogous to disk 211 described with reference to FIG. 2 above.

At step 615, the existing data that would normally be overwritten with the new data is not overwritten. Rather, the change data is recorded as a time-based revision of the original file (viewing from an application level perspective). Similarly as new data changes have for the same data file, they too are recorded separately from the previous change. In this way file based and time-based recovery services may be offered wherein the client can browse the number of revised versions of a same file, for example, and recover only the version or versions desired.

Data on the secondary storage system is viewable as volume block data, file system data, and application level data. It is also recoverable in the same views. Primary storage offset locations will be different than secondary storage offset locations. However, communication capability between the disk storage systems enables synchronizing of positions so that one may be directed to the exact writer or read position in either system from the domain of either system.

One with skill in the art will appreciate that the secondary storage system of the present invention may be applied locally as a self-contained CPE solution or as a remotely accessible service without departing from the spirit and scope of the present invention. Performance of the primary data channels between host nodes and primary storage are not taxed in any way by the secondary storage system. Much work associated with manually directed backup operations as performed in prior art environments is eliminated.

Figure 7:
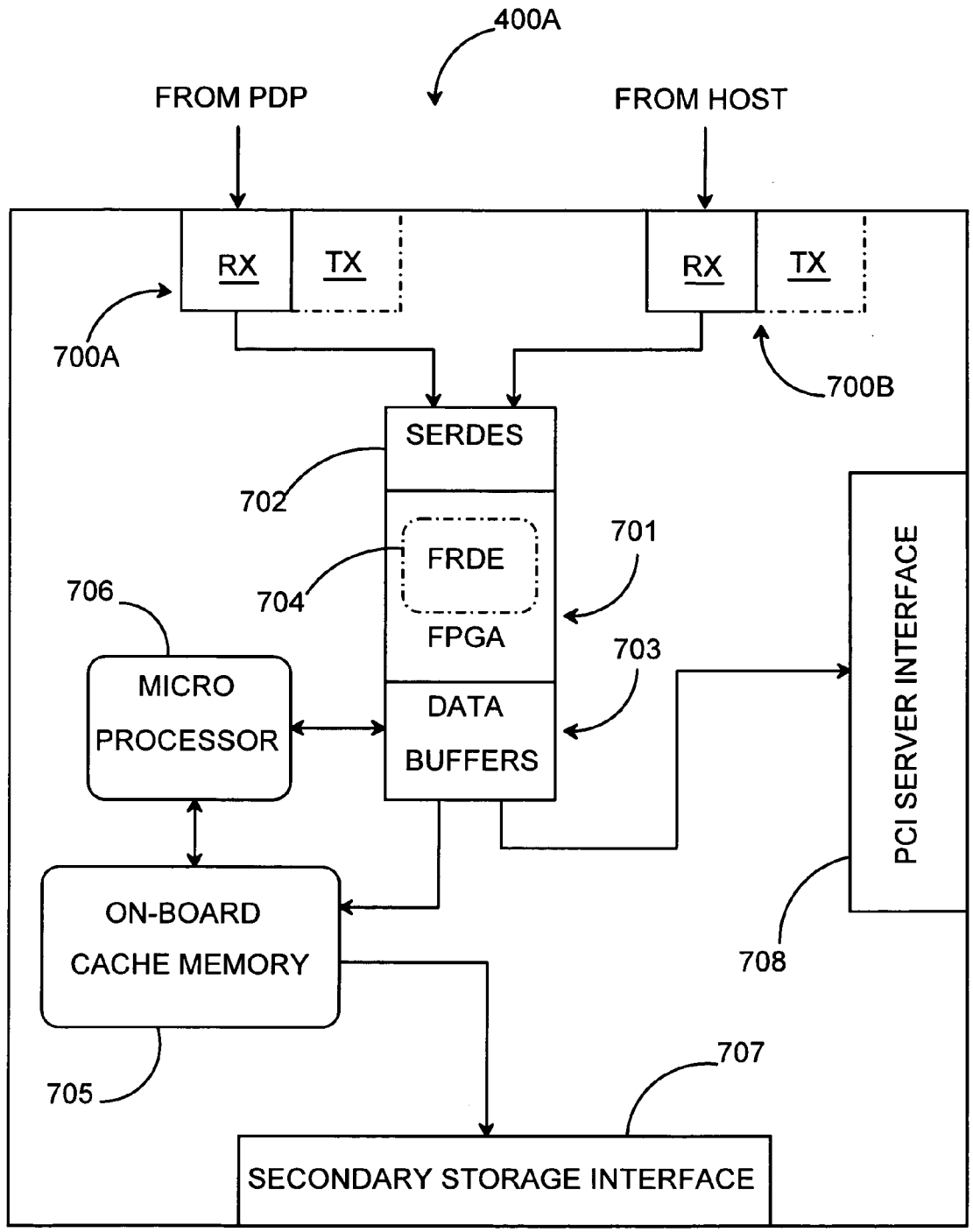
FIG. 7 is a block diagram illustrating components of one of line cards of FIG. 4 according to an embodiment of the present invention.

FIG. 7 is a block diagram illustrating components of one of line cards 401(1-N) of FIG. 4 according to an embodiment of the present invention. Line card (LC) 401(1) can be any one of cards 401 that are dedicated for receive only of split data from PDPs. The designation 401(1) is arbitrary. Card 401(1) may hereinafter be referred to simply as card 401. Card 401 has an RX port 700A capable of receiving data transparently split from a PS system analogous to the PS system (D1-DN) of FIG. 2 above. It is noted that card 401 cannot send data to the PS through the splitter onto the PDP. Card 401 also has an RX port 700b capable of receiving data transparently spit from a client machine or LAN host analogous to one or more of hosts 204(1-N) of FIG. 2. Similarly, card 401 cannot send data to any host through the splitter onto the PDP. The incoming lines are one way only so that data splitting is completely passive. In one embodiment card 401 is fabricated from the ground up to include only RX ports specially adapted to receive split data. In another embodiment a generic card blank is used but the TX port circuitry is disabled from sending any data.

A Field Programmable Gate Array (FPGA) 701 is provided to card 401 and is adapted among other purposes for maintaining proper data rate through card 401 into cache and to secondary storage. FPGA 701 is associated with a serializer/de-serializer (SERDIES) device 702, which are known in the art and adapted for serializing and de-serializing data streams in data streaming devices. Device 702 de-serializes the data stream incoming from RX ports 700A and 700B for analysis and buffer loading. Card 401 has a data buffer or buffers provided thereto and adapted to hold data incoming from a splitter for processing. Data is streamed into card 401 and streamed out to secondary storage in near real time. That is to say that all data changes from hosts for write to secondary storage are processed from an incoming stream and offloaded in an outgoing stream for write to secondary storage.

In a streaming embodiment it is important to know the current data rate of incoming data so that processing data buffering and data outflow runs smoothly without overloading or under utilizing the data buffers and without having to discard any important data frames. Card 401 can only receive data from the splitter so it has no physical link control. Therefore, a method has to be implemented for deducing the actual data rate of the incoming stream and for fine-tuning the processing and buffer performance accordingly.

FPGA 701 has a frame rate detection engine (FRDE) 704 installed therein through firmware programming. FRDE 704 uses PLL and other technologies to fine-tune SERDIES performance, buffer performance and other internal data processing streams to a stable and constant data rate deduced through PLL methods. Card 401 has a microprocessor 706 provided thereto and having processing access to data residing in buffers 703. Processor 706 performs metadata comparison in one embodiment where it is practiced onboard rather than off-board using the server CPU. Processor 706 may also perform frame decoding, address decoding, data compression and data writing Functions in one embodiment utilizing an onboard cache memory 705.

Card 401 has a secondary storage interface 707 analogous to the unshared interface 506A of FIG. 5B and a PC1 server interface 708 analogous to the shared interface 506B of the same. Each interface is optional as long as one is used. Cache memory 705 is also optional in one embodiment. In another embodiment all described components and interfaces are present n card 401 and may be programmed for optional use states either offloading data from buffers through the server interface onto a server bus and into a server cache for further processing, or by emptying buffers into cache 705 for further processing and direct writing through interface 707 to secondary storage bypassing server resources altogether.

The present invention is not limited to SCSI, FC, or SAN architectures. DAS and NAS embodiments are possible wherein FC switches or Ethernet Hubs between separate networks are not required. Likewise, several SANS connected by a larger WAN may be provided secondary storage and recovery services from a central network-connected location, or from a plurality of systems distributed over the WAN. VIP security and tunneling protocols can be used to enhance performance of WAN-based distributed systems.

Figure 8:
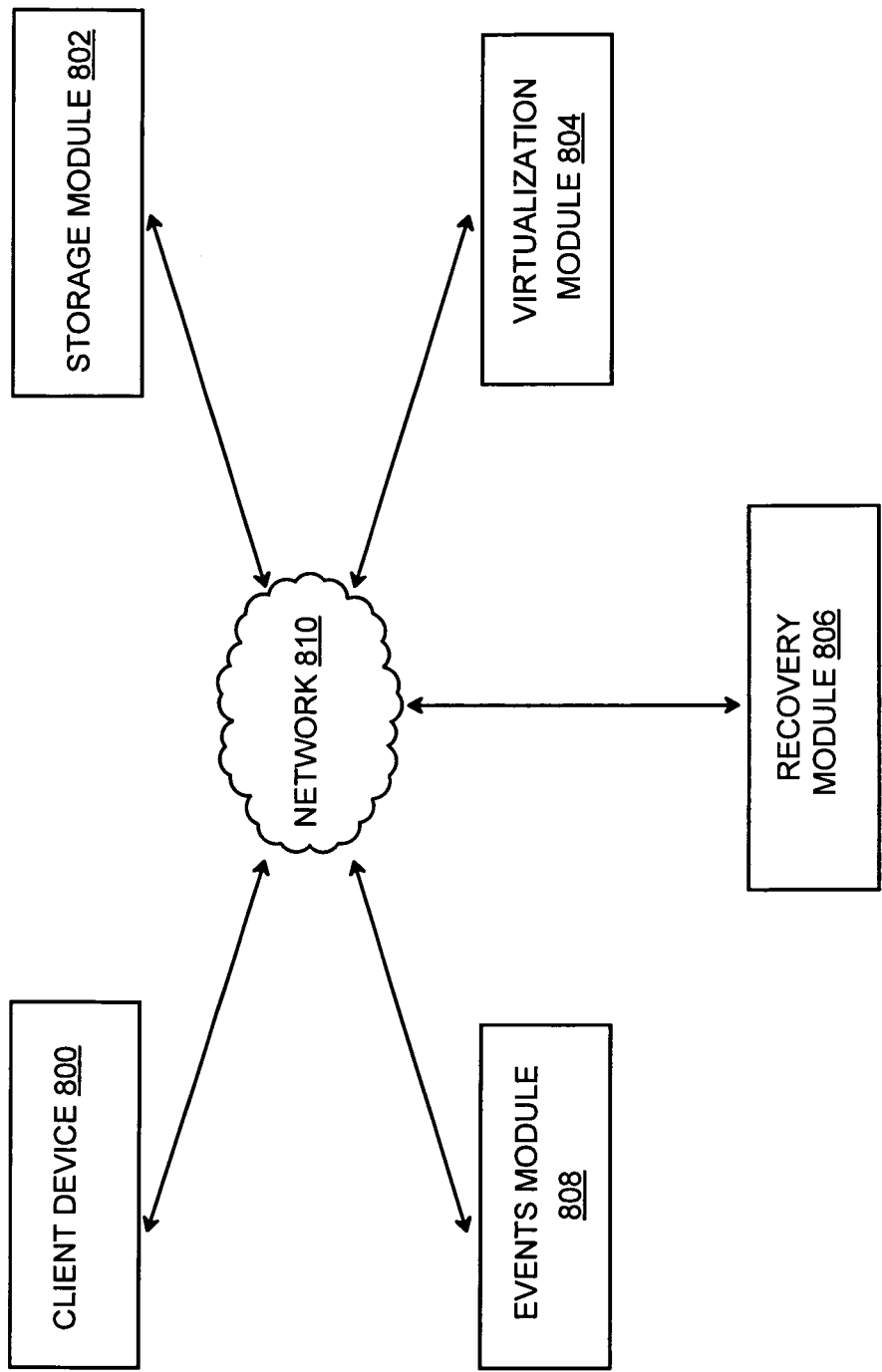
FIG. 8 is a system view of a virtualization module, a recovery module, that communicates with a client device, an events module, and/or a storage module through a network, according to one embodiment.

FIG. 8 is a system view of a virtualization module 804, a recovery module 806, that communicates with a client device 800, an events module 808, and/or a storage module 802 through a network 810, according to one embodiment. A client device (e.g., the client device 800) may be an end user device (e.g., a customer interface, a system administrator control device, and/or a technical support device, etc.). A storage module (e.g., the storage module 802) may be a volatile storage (e.g., DRAM, RDRAM, and/or SRAM, etc.) and/or a non-volatile storage (e.g., hard disk drive, RAID array, SCSI drive, SATA drive, magnetic tape, CD, and/or DVD, etc.). A network (e.g., the network 810) may be a LAN, WAN, and/or an Internet. A virtualization module (e.g., the virtualization module 804) is best understood with reference to FIG. 9, as will later be described. The recovery module 806 may also be best understood with reference to FIG. 10, and the events module 808 may best be understood with reference to FIG. 11.

In another embodiment, the client device 800 may generate a data operation (e.g., a data storage, a data backup, a data retrieval, a data modification, a data transfer, etc.) request through the network 810 (e.g., LAN, WAN, and/or Internet, etc.). For example, the client device 800 may define an event (e.g., midnight, every 5 minutes, system crash, configuration change, failed log-in, and/or as indicated by the events module 808 of FIG. 8, etc.) through communicating with the events module 808. The client device 800 may also generate a request for backup via communication with the recovery module 806. A data backed up by the recovery module 806 may be stored in the storage module 802.

The recovery module 806 may also provide a mechanism to continuously backup data as well as a means to access data points relative to a reference data point. The reference data point may be associated with an event (e.g., midnight, every 5 minutes, system crash, configuration change, failed log-in, and/or as indicated by the events module 808 of FIG. 8, etc.) stored in the events module 808. Before a data point associated with the event (e.g., midnight, every 5 minutes, system crash, configuration change, failed log-in, and/or as indicated by the events module 808 of FIG. 8, etc.) is accessed, the virtualization module 804 may generate a data view (e.g., a virtual view) such that the original data may not need to be modified.

An example embodiment provides methods and systems to form (e.g., formed by the virtualization module 804) a data view (e.g., a virtual view, an original view, etc.) around a recovery point (e.g., midnight, every 5 minutes, system crash, configuration change, failed log-in, and/or as specified in the events module 808 etc.) and shift the data view (e.g., a virtual view, an actual view, etc.) around the recovery point through a direction-agnostic roll algorithm that uses a roll-forward algorithm (e.g., to roll to a data state that occurred later in time than the reference data, etc.) to shift the data view (e.g., a virtual view, an actual view, etc.) to a time after the recovery point (e.g., midnight, every 5 minutes, system crash, configuration change, failed log-in, and/or as specified in the events module 808 etc.) and/or a roll-backward algorithm (e.g., to roll to the data state that occurred earlier in time than the reference data, etc.) to shift the data view (e.g., a virtual view, an original view, etc.) to a time before the recover point (e.g., midnight, every 5 minutes, system crash, configuration change, failed log-in, and/or as specified in the events module 808 etc.).

Another example embodiment provides methods and systems to generate a recovery snapshot (e.g., to generate a virtual snapshot with the virtualization module 804, etc.) at a predetermined interval (e.g., midnight, every 5 minutes, system crash, configuration change, failed log-in, and/or as indicated by the events module 808 of FIG. 8, etc.) to retain an ability to position forward (e.g., to roll to a data state that occurred later in time than the reference data, etc.) and/or backward (e.g., to roll to the data state that occurred earlier in time than the reference data, etc.) when a delayed roll back algorithm is applied, and create a virtual view (e.g., create a virtual view using the virtualization module 804, etc.) of the recovery snapshot using an algorithm (e.g., a continuous recovery algorithm of the recovery module 806) tied to an original data, a change log data, and a consistency data related to an event (e.g., midnight, every 5 minutes, system crash, configuration change, failed log-in, and/or as indicated by the events module 808 of FIG. 8, etc.).

A further example embodiment includes a virtualization module 804 to form a data view (e.g., a virtual view, an actual view, etc.) around a recovery point (e.g., midnight, every 5 minutes, system crash, configuration change, failed log-in, and/or as specified in the events module 808, etc.), and/or an events module 808 to generate a coalesce policy (e.g., to retain data every 5 minutes for data that is older than 10 years, to retain data every 2 minutes for data that is less than 10 years old, etc.) around the recovery point (e.g., midnight, every 5 minutes, system crash, configuration change, failed log-in, and/or as specified in the events module 808, etc.) to reduce a storage requirement (e.g., to decrease a storage capacity requirement of the storage module 802). The generated coalesce policy may be used (e.g., used by the recovery module 806) to coalesce (e.g., combine, compile, etc.) backed up data to optimize storage requirements.

Figure 9:
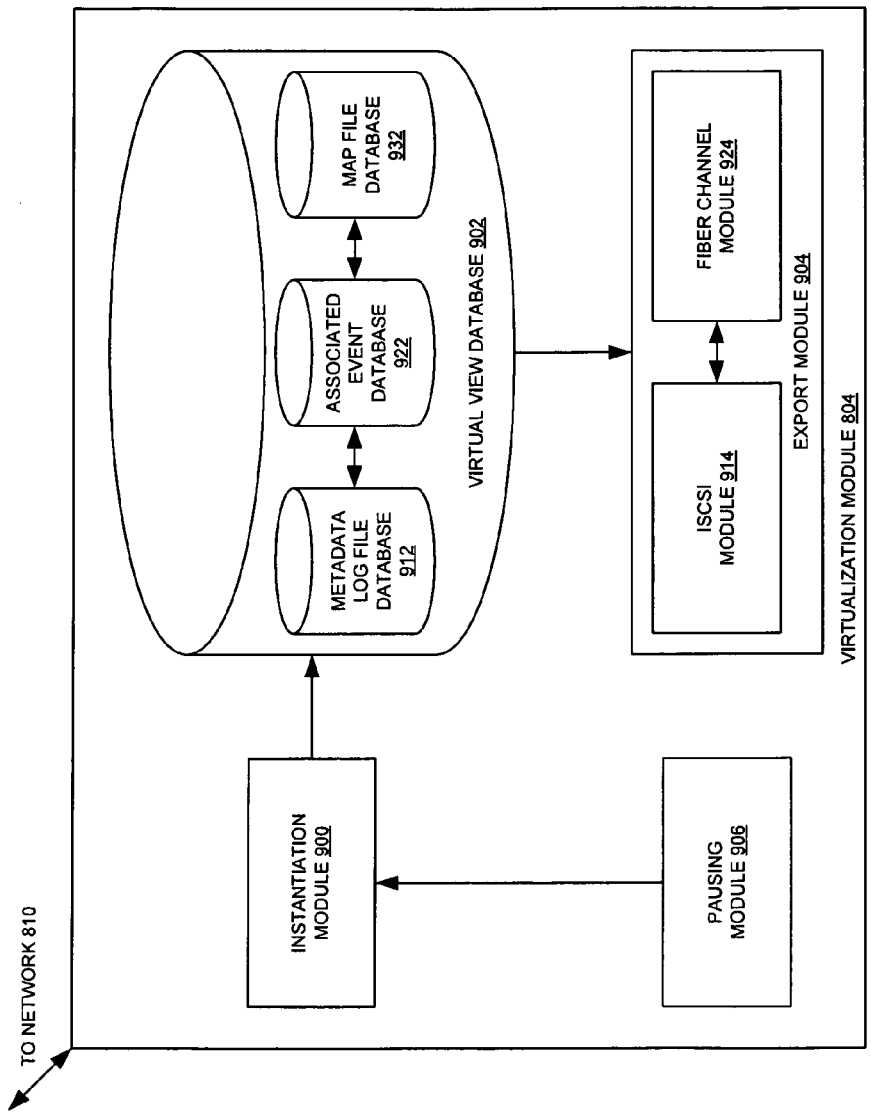
FIG. 9 is an exploded view of the virtualization view module of FIG. 8 having an instantiation module, a pausing module, a virtual view database having a metadata log file database, an associated event database, and/or a map file database, and/or an export module having an iSCSI module, and/or a fiber channel module, according to one embodiment.

FIG. 9 is an exploded view of the virtualization module 804 of FIG. 8 having an instantiation module 900, a pausing module 906, a virtual view database 902 that may include a metadata log file database 912, an associated event database 922, and/or a map file database 932, and/or an export module 904 having an ISCSI module 914, and/or a fiber channel module 924, according to one embodiment.

The instantiation module 900 may be a circuit and/or a piece of software code that generates a virtual view of a data state. The instantiation module 900 may communicate with the pausing module 906 to determine when the virtual view should be generated to ensure validity and/or accuracy. The instantiation module 900 may also communicate the generated virtual view to the virtual view database 902 to be stored.

According to one embodiment, the virtual view may be instantiated by an instantiation module (e.g., the instantiation module 900) of the virtual view module 804. The virtual view may be generated after a data operation and/or a client operation (e.g., a client operation of the client device 800 of FIG. 8) has been suspended and/or paused (e.g., paused by the pausing module 906) to ensure a validity and/or accuracy of the virtual view generated. After the virtual view has been generated by the instantiation module 900, the virtual view may be stored in a database (e.g., the virtual view database 902, etc.).

In one embodiment, a data view (e.g., a snapshot view) may be formed to prevent losing an ability to roll forward and/or backward when a delayed roll backward algorithm is applied. Any number of snapshot views may be taken. However to generate and/or to store a snapshot view may be time and/or capacity consuming. As such, a virtual view of the data may be generated (e.g., generated by the instantiation module 900 of the virtual view module 804 of FIG. 8) rather than making a full snapshot view of the data.

In a further embodiment, the database (e.g., the virtual view database 902) may contain additional databases to store a meta data log file (e.g., the metadata log file database 912), an associated event (e.g., the associated event database 922), and/or a map file (e.g., the map file database 932). A relevant information mapping information (e.g., a map file) of associating an original data to the data view (e.g., a virtual view, a real view, and/or a snapshot view, etc.) may be stored in the map file database 932 of the virtual view database 902. A log file (e.g., a meta data log file) documenting change (e.g., time stamp of changes, location of changes, time offset of changes, etc.) of the data view (e.g., a virtual view, a real view, and/or a snapshot view, etc.) may be stored in the metadata log file database 912. The log file may also be stored as a normal file on a file system using a relational database (e.g., an SQL database).

In yet another embodiment, the virtual view database 902 may communicate with the instantiation module 900 to receive, store, and/or update a data (e.g., the metadata log file, an associated event, and/or a map file, etc.) of the virtual view to ensure that the virtual view remains updated and/or valid. The virtual view database 902 may also transfer the virtual view to the export module 904 having an iSCSI interface (e.g., an iSCSI interface of the iSCSI module 914) and/or a fiber channel interface (e.g., a fiber channel interface of the fiber channel module 924) to automatically transfer the virtual view to an external storage device (e.g., a storage module 802 of FIG. 8).

For example, the data view (e.g., a virtual view, a real view, and/or a snapshot view, etc.) generated (e.g., generated by the instantiation module 900 of the virtual view module 804 of FIG. 8) may also be automatically and/or manually exported via an iSCSI interface (e.g., the iSCSI module 914) and/or a fiber channel interface (e.g., the fiber channel module 924) of an export interface (e.g., the export module 804). As such, each virtual view may be backed up as necessary and/or used for rolling data backward and/or forward in the recovery module 806 of FIG. 8.

In one embodiment, the virtualization module 804 may form a data view (e.g., a virtual view, a real view, and/or a snapshot view, etc.) around a recovery point (e.g., midnight, every 5 minutes, system crash, configuration change, failed log-in, and/or as indicated by the events module 808 of FIG. 8, etc.). The pausing module 906 may temporarily suspend an activity of a client device (e.g., a client device 800 of FIG. 8) before the instantiation module 900 generates a data view (e.g., a virtual view, a real view, and/or a snapshot view, etc.). The pausing module 906 may restart the operation of the client device (e.g., the client device of FIG. 8) after the data view (e.g., a virtual view, a real view, and/or a snapshot view, etc.) has been generated.

In another example embodiment, an event associated with a generation of the data view (e.g., a virtual view, a real view, and/or a snapshot view, etc.) may be stored in the associated event database 922. Additionally, the data view (e.g., a virtual view, a real view, and/or a snapshot view, etc.) may be exported through the iSCSI module 914 and/or the fiber channel module 924 of the export module 914.

In another embodiment, the virtualization module 804 may form the data view (e.g., a virtual view, a real view, and/or a snapshot view, etc.) around a recovery point (e.g., midnight, every 5 minutes, system crash, configuration change, failed log-in, and/or as indicated in the events module 808 of FIG. 8, etc.). The virtualization module 804 may also determine that a data integrity (e.g., unaltered, unmodified, and/or not destroyed, etc.) is consistent at the recovery point by examining data and meta-data associated with the recovery point (e.g., midnight, every 5 minutes, system crash, configuration change, failed log-in, and/or as indicated in the events module 808 of FIG. 8 etc.).

The virtualization module 804 of FIG. 8 may maintain a data adjacent to the recovery point (e.g., midnight, every 5 minutes, system crash, configuration change, failed log-in, and/or as indicated in the events module 808 of FIG. 8, etc.) in a log data structure. In yet another embodiment, the creation of a virtual view may be specific to a kernel. A drive in the kernel (e.g., piece of software responsible for providing secure access to the machine's hardware to various computer programs) may create a volume object that appears to be a real volume and access requests (e.g., a read, and/or a write request, etc.) to the virtual view may be handled by a kernel space code. A retention log of the virtual view may then be referenced to complete the access requests (e.g., the read, and/or the write request, etc.). A data may be stored in a binary-tree based lookup table to optimize access speed due to a constant time lookup algorithm.

In another embodiment, the virtualization module 804 of FIG. 8 may create a virtual view of a recovery snapshot using an algorithm tied to an original data, a change log data, and a consistency data related to an event (e.g., midnight, every 5 minutes, system crash, configuration change, failed log-in, and/or as indicated in the events module 808 of FIG. 8, etc.). The virtualization module 804 may also redirect the access request (e.g., the read, and/or the write request) to the original based on a meta-data information provided in the virtual view. The virtualization module 804 may also substantially retain a timestamp data, a location of a change, and a time offset of the change as compared with the original data (e.g., originally saved data, an originally backed up data, etc.).

The virtualization module 804 may utilize a relational database (e.g., SQL database) to process the change log data in a meta-data format (e.g., through the metadata log file database 912), and to process other on-disk data using a binary-tree format. The virtual view may be specific to a volume object in a kernel (e.g., piece of software responsible for providing secure access to the machine's hardware to various computer programs) that imitates another volume having the original data. The virtual view may also be managed by a kernel space (e.g., piece of software responsible for providing secure access to the machine's hardware to various computer programs) that processes an access request through at least one table using a meta-data (e.g., the metadata file database 912) created in a retention log. The virtual view may be exported as a virtual volume by the export module 904 using the iSCSI module 914 and/or the fiber channel module 924 to transport to an external processing device (e.g., a computer, a PDA, and/or a storage module 802, etc.).

Furthermore, the virtualization module 804 may apply the change log data of the virtual view database 902 when the virtual view is unfrozen (e.g., unfrozen by the pausing module 906) after a user session reaches a level state. The virtual view may be unfrozen after a user session reaches a level state to be appropriated updated through modifications of the virtual view database 902. Hence a metadata index of the metadata log file database 912 may need to be updated continuously. A map file of the map file database 932 may also need to be updated while the virtual view is being created (e.g., by the instantiation module 900) and/or after it has been created. The updates and/or modifications of the map file (e.g., the map file of the map file database 932) and/or the log file (e.g., the log file of the metadata log file database 912) may be necessary to ensure that the virtual view maintains a relevant representation of the original data.

In a further embodiment, a series of indexes (e.g., using indexes to improve query performance) of the virtual view may be generated by the virtualization module 804 to enable a linking to an event description (e.g., content-based description) of the virtual view rather than to an actual data in the original data. The event description of the virtual view may (e.g., stored in the associated events database 922) may allow the series of indexes to locate the virtual views by a content located within the virtual view. The data view (e.g., a virtual view, a real view, and/or a snapshot view, etc.) may also be automatically communicated to the export module 904 to transport the virtual view to a backup tape (e.g., magnetic tape, external hard disk drive, CD, DVD, etc.) to provide extended data retention using a lifecycle management policy. Therefore, older data may be retroactively transferred from the storage module 802 for storage space maintenance.

Figure 10:
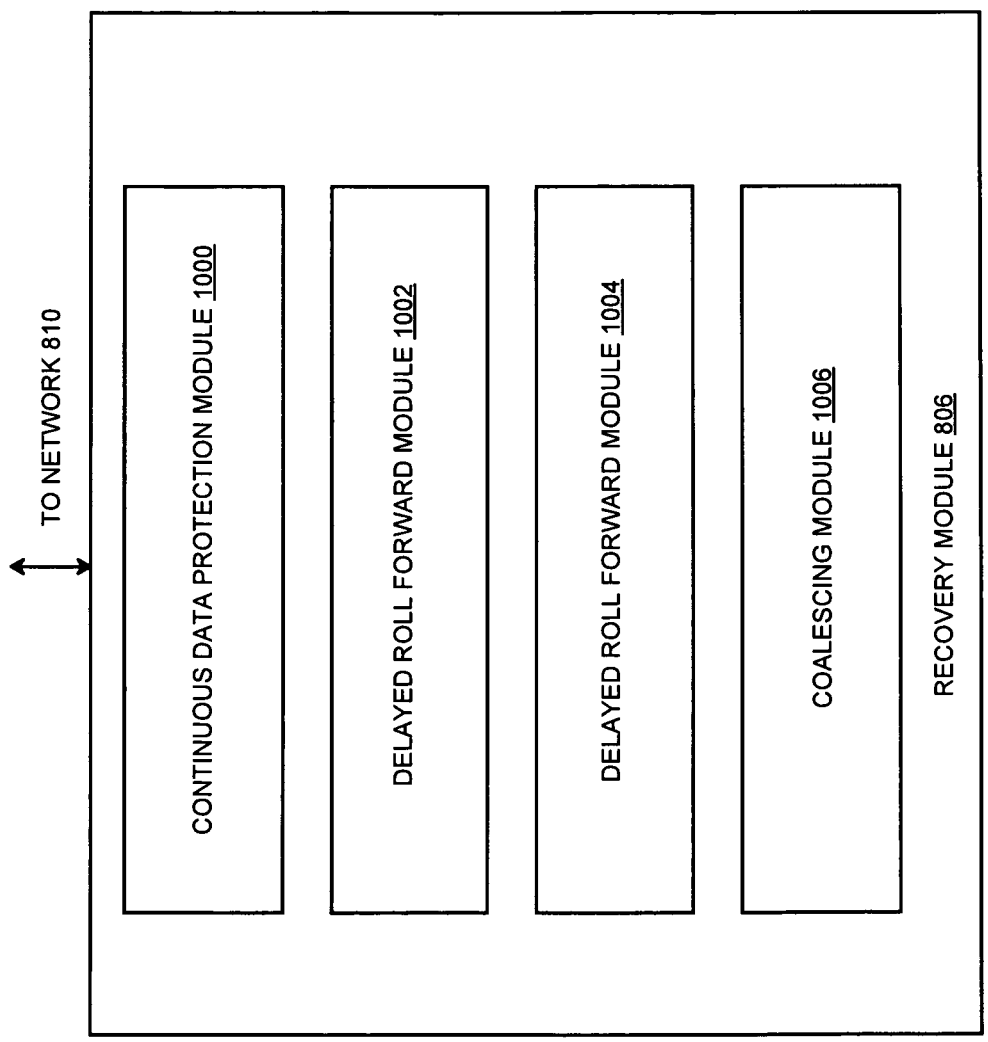
FIG. 10 is an exploded view of the recovery module of FIG. 8 having a continuous data protection module, a delayed roll forward module, a delayed roll backward module, and/or a coalescing module, according to one embodiment.

FIG. 10 is an exploded view of the recovery module 806 of FIG. 8 having a continuous data protection module 1000, a delayed roll forward module 1002, a delayed roll backward module 1004, and/or a coalescing module 1006, according to one embodiment. The continuous protection module 1000 may provide continuous backup mechanism (e.g., recording every change made to a data) to a set of data. The continuous protection module 1000 may communicate with a storage module (e.g., a storage module 802 of FIG. 8), a client device (e.g., the client device 800 of FIG. 8), and/or an events module (e.g., the events module 808 of FIG. 8) to automatically detect a data change and/or to automatically save the data change.

The delayed roll forward module 1002 may communicate with a storage module (e.g., the storage module 802 of FIG. 8) to perform a roll forward operation on a stored data. The delay roll forward module 1002 may also communicate with an events module (e.g., the events module 808 of FIG. 8) to associate a data state with a specified event (e.g., midnight, every 5 minutes, system crash, configuration change, failed log-in, and/or as indicated in the events module 808 of FIG. 8 etc.).

The delayed roll backward module 1004 may communicate with a storage module (e.g., the storage module 802 of FIG. 8) to perform a roll backward operation on a stored data. The delay roll backward module 1002 may also communicate with an events module (e.g., the events module 808 of FIG. 8) to associate a data state with a specified event (e.g., midnight, every 5 minutes, system crash, configuration change, failed log-in, and/or as indicated in the events module 808 of FIG. 8 etc.).

The delayed roll forward module 1002 may roll a data to a state corresponding to an event that happened later in time than an event (e.g., midnight, every 5 minutes, system crash, configuration change, failed log-in, and/or as indicated in the events module 808 of FIG. 8, etc.) associated with a reference data. The delayed roll backward module 1004 may roll the data to a state corresponding to the event (e.g., midnight, every 5 minutes, system crash, configuration change, failed log-in, and/or as indicated in the events module 808 of FIG. 8, etc.) that happened earlier in time than the event associated with the reference data.

The recovery module 806 of FIG. 8 may also allow backed up data to be accessed before a recovery point (e.g., midnight, every 5 minutes, system crash, configuration change, failed log-in, and/or as indicated in the events module 808 of FIG. 8, etc.) through the delayed roll backward module (e.g., the delayed roll backward module 1004) and/or after the certain recovery point through the delayed roll forward module (e.g. the delayed roll forward module 1002). The recovery point may be tied to an event (e.g., midnight, every 5 minutes, system crash, configuration change, failed log-in, and/or as indicated by the events module 808 of FIG. 8, etc.).

A coalescing module (e.g., the coalescing module 1006) may use a coalescing events and/or a coalescing policies as specified in the events module 808 of FIG. 8 to coalesce (e.g., combine, compile, etc.) backed up data to optimize storage requirements. The coalescing module (e.g., the coalescing module 1006) may communicate with an events database (e.g., an events database of the events module 808 of FIG. 8) to determine the event around which data should be collapsed (e.g., coalesced, combined, etc.).

In one embodiment, the delayed roll forward module 1002 and/or the delayed roll backward module 1004 may shift a data view (e.g., a virtual view, a real view, and/or a snapshot view, etc.) around the recovery point (e.g., midnight, every 5 minutes, system crash, configuration change, failed log-in, and/or as indicated by the events module 808 of FIG. 8, etc.)

through a direction-agnostic roll algorithm that uses a roll forward algorithm to shift the data view to a time after the recovery point (e.g., midnight, every 5 minutes, system crash, configuration change, failed log-in, and/or as indicated by the events module 808 of FIG. 8, etc.) and/or a roll backward algorithm to shift the data view (e.g., a virtual view, a real view, and/or a snapshot view, etc.) to a time before the recovery point.

The recovery point (e.g., midnight, every 5 minutes, system crash, configuration change, failed log-in, and/or as indicated by the events module 808 of FIG. 8, etc.) may be associated with an automatically generated event, a user definable event, and/or a prepackaged event. Additionally, the continuous protection module 1000 may generate a recovery snapshot at a predetermined interval (e.g., midnight, every 5 minutes, etc.) to retain an ability to position forward and/or backward when a delayed roll backward algorithm is applied.

In a next embodiment, the coalescing module 1006 may coalesce data around the recovery point (e.g., midnight, every 5 minutes, system crash, configuration change, failed log-in, and/or as indicated by the events module 808 of FIG. 8, etc.) and other determinable recovery points at a threshold interval to reduce storage requirements. In addition, the coalescing module 1006 may retain different quantities of data around the recovery point (e.g., midnight, every 5 minutes, system crash, configuration change, failed log-in, and/or as indicated by the events module 808 of FIG. 8, etc.) based on a programmatic methodology that considers space utilization and a data consistency associated with the time after the recover point and/or the time before the recovery point. For example, more data points may be retained for data accumulated 5 days ago whereas less data points may be retained for data accumulated 5 years ago.

Figure 11:
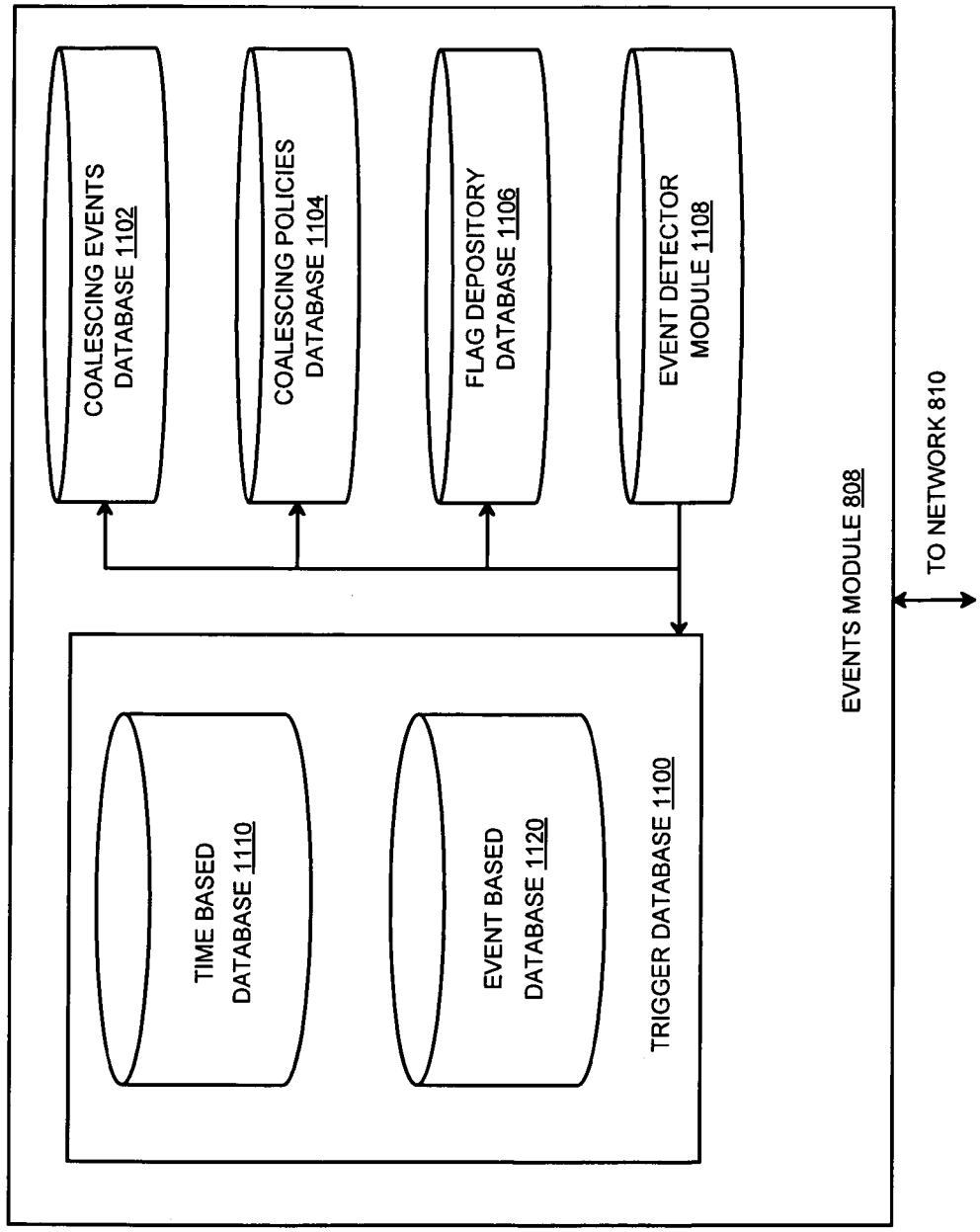
FIG. 11 is an exploded view of the events module of FIG. 8 having a trigger database having a time based database and/or a event based database, a coalescing events database, a coalescing policies database, a flag depository database, and/or an event detector module, according to one embodiment.

FIG. 11 is an exploded view of the events module 808 of FIG. 8 having a trigger database 1100 having a time based database 1110 and/or an event based database 1120, a coalescing events database 1102, a coalescing policies database 1104, a flag depository database 1106, and/or an event detector module 1108, according to one embodiment.

In one example embodiment, the trigger database 1100 may store any backup triggering event. The backup triggering event may be time based (e.g., stored in the time based database 1110) and/or event based (e.g., stored in the event based database 1120). The coalescing events database may communicate with a coalescing module (e.g., a coalescing module 1006 of FIG. 10) to determine an event corresponding to a data collapsing. The coalescing policies database 1104 may also communicate with the coalescing module 1006 of FIG. 10 to govern an age dependent data retaining mechanism. For example, older data may be retained with less data points. The flag depository database 1106 may communicate with the trigger database 1100, the storage module 802 of FIG. 8, and/or the continuous data protection module 1000 of FIG. 10 to store a flag indicating a data state associated with an event as specified in the events module 808 of FIG. 8 at which data was backed up. The event detector module 1108 may detect a user definable event and/or an automatically generated event by communicating with a client device 800, the trigger database 1100, the coalescing events database 1102, and/or the coalescing policies database 1104. The user definable event may be communicated by a client device (e.g., the client device 800 of FIG. 8). The events detected by the event detector module 1108 may then be stored in the trigger database 1100 and stored in the time based database 1110 if an event is time based (e.g., midnight, every 5 minutes, etc.), and stored in the event based database 1120 if the event is event based e.g., system crash, configuration change, failed log-in, and/or as indicated by the events module 808 of FIG. 8, etc.).

In another example embodiment, the events module (e.g. the events module 808 of FIG. 8) may also communicate with a recovery module (e.g., the recovery module 806 of FIG. 8) to associate data points with events (e.g., midnight, every 5 minutes, system crash, configuration change, failed log-in, and/or as indicated by the events module 808 of FIG. 8, etc.). As such the recovery module (e.g., the recovery module 806 of FIG. 8) may perform relevant operations (e.g., a delayed roll forward of the delayed roll forward module 1002, a delayed roll backward of the delayed roll backward module 1004, and/or coalescing of the coalescing module 1006 of FIG. 10, etc.) based on an associated event.

The event detector module 1108 of the events module 808 may also detect coalescing events defined by a user and/or automatically generated. The coalescing events may be stored in the coalescing events database 1102. In another embodiment, the events module 808 may generate a coalescing policy (e.g., number of data points retained for different time periods, etc.) around the recovery point (e.g., midnight, every 5 minutes, system crash, configuration change, failed log-in, and/or as indicated by the events module 808 of FIG. 8, etc.) to reduce a storage requirement. The coalescing policy may be stored in the coalescing policy database 1104.

In one embodiment, the event detector module 1108 may generate a marking data (e.g., a flag, a bookmark, etc.) at the recovery point (e.g., midnight, every 5 minutes, system crash, configuration change, failed log-in, and/or as indicated by the events module 808 of FIG. 8, etc.) to enable the direction-agnostic roll algorithm (e.g., a roll-forward algorithm (e.g., to roll to a data state that occurred later in time than the reference data, etc.) and/or a roll-backward algorithm (e.g., to roll to the data state that occurred earlier in time than the reference data, etc.) to operate and to reduce a recovery time objective (e.g., to minimize the time to recovery in case of system malfunction) when an algorithm is applied. The marking data (e.g., a flag, a bookmark, etc.) may be stored in the flag depository database 1106.

Figure 12:
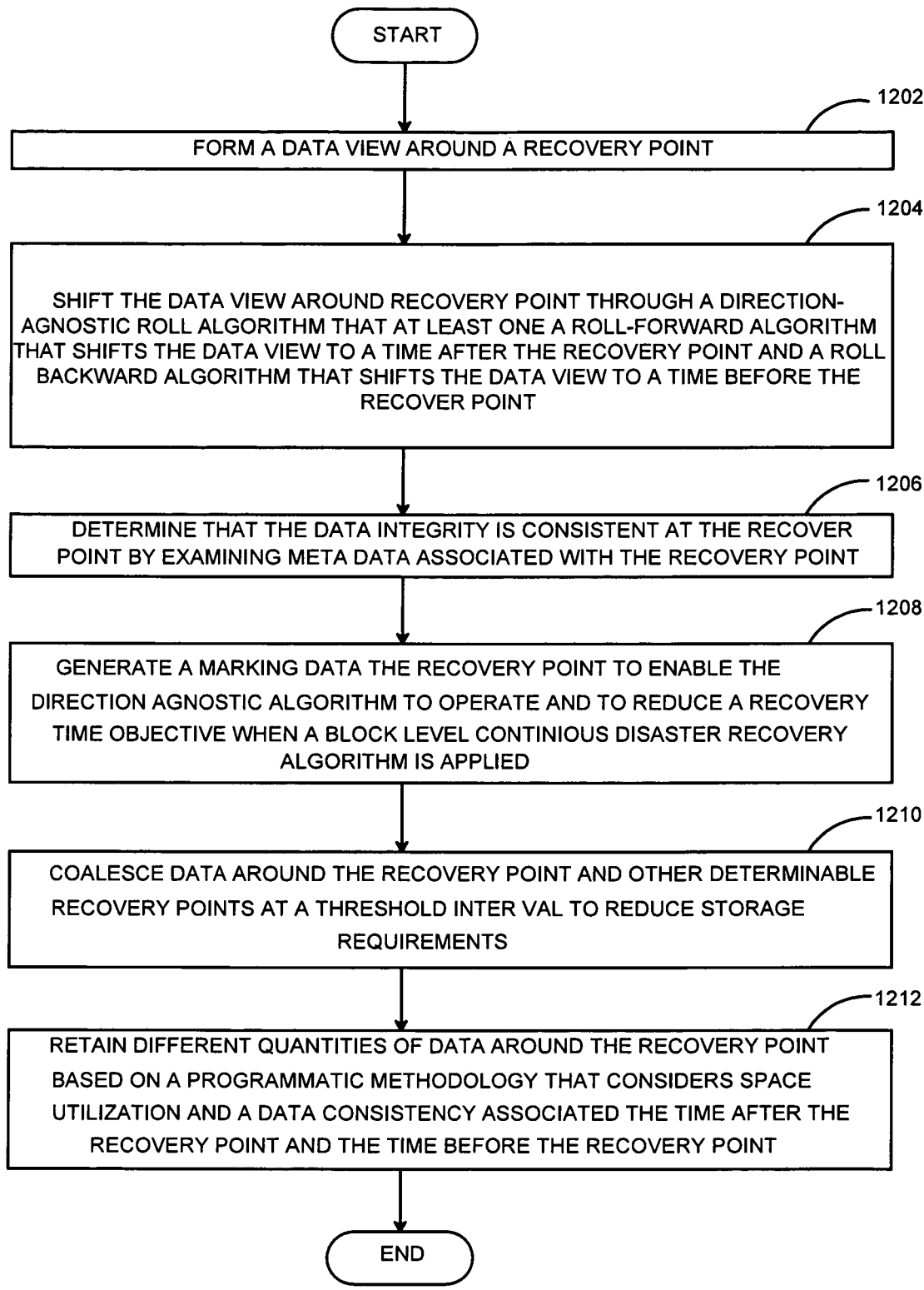
FIG. 12 is a process flow to form a data view around a recovery point, according to one embodiment.

FIG. 12 is a process flow to form a data view around a recovery point, according to one embodiment. In operation 1202, the data view (e.g., a virtual view, a real view, and/or a snapshot view, etc.) may be formed (e.g., formed by the virtual view module 804 of FIG. 9) around a recovery point (e.g., midnight, every 5 minutes, system crash, configuration change, failed log-in, and/or as indicated by the events module 808 of FIG. 8, etc.). In operation 1204, the data view may be shifted (e.g., shifted by the delayed roll forward module 1002 and/or the delayed roll backward module 1004 of FIG. 10) around the recovery point (e.g., midnight, every 5 minutes, system crash, configuration change, failed log-in, and/or as indicated by the events module 808 of FIG. 8, etc.) through a direction-agnostic roll algorithm that uses at least one of a roll-forward algorithm (e.g., to roll to a data state that occurred later in time than the reference data, etc.) to shift the data view (e.g., a virtual view, a real view, and/or a snapshot view, etc.) to a time after the recovery point (e.g., midnight, every 5 minutes, system crash, configuration change, failed log-in, and/or as indicated by the events module 808 of FIG. 8, etc.) and a roll-backward algorithm (e.g., to roll to the data state that occurred earlier in time than the reference data, etc.) to shift the data view (e.g., a virtual view, a real view, and/or a snapshot view, etc.) to a time before the recover point (e.g., midnight, every 5 minutes, system crash, configuration change, failed log-in, and/or as indicated by the events module 808 of FIG. 8, etc.).

In operation 1206, a data integrity may be determined to be consistent (e.g., complete, valid, etc.) at the recovery point e.g., midnight, every 5 minutes, system crash, configuration change, failed log-in, and/or as indicated by the events module 808 of FIG. 8, etc.) by examining data and meta-data associated with the recovery point. In operation 1208, a marking data (e.g., a flag, a bookmark, etc.) may be generated (e.g., generated by the recovery module 806 of FIG. 8) at the recovery point (e.g., midnight, every 5 minutes, system crash, configuration change, failed log-in, and/or as indicated by the events module 808 of FIG. 8, etc.) to enable the direction-agnostic roll algorithm (e.g., a roll forward algorithm of the delayed roll forward module 1002 of FIG. 10, and/or a roll backward algorithm of the delayed roll backward module 1004 of FIG. 10, etc.) to operate and to reduce a recovery time objective (e.g., a time required to recover from a system failure, etc.) when an algorithm is applied.

In operation 1210, data may be coalesced (e.g., coalesced by the coalescing module 1006 of FIG. 10) around the recovery point (e.g., midnight, every 5 minutes, system crash, configuration change, failed log-in, and/or as indicated by the events module 808 of FIG. 8, etc.) and other determinable recovery points at a threshold interval to reduce storage requirements. In operation 1212, differing quantities of data may be retained around the recovery point (e.g., midnight, every 5 minutes, system crash, configuration change, failed log-in, and/or as indicated by the events module 808 of FIG. 8, etc.) based on a programmatic methodology that considers space utilization and a data consistency associated with the time after the recovery point (e.g., midnight, every 5 minutes, system crash, configuration change, failed log-in, and/or as indicated by the events module 808 of FIG. 8, etc.) and the time before the recovery point.

Figure 13:
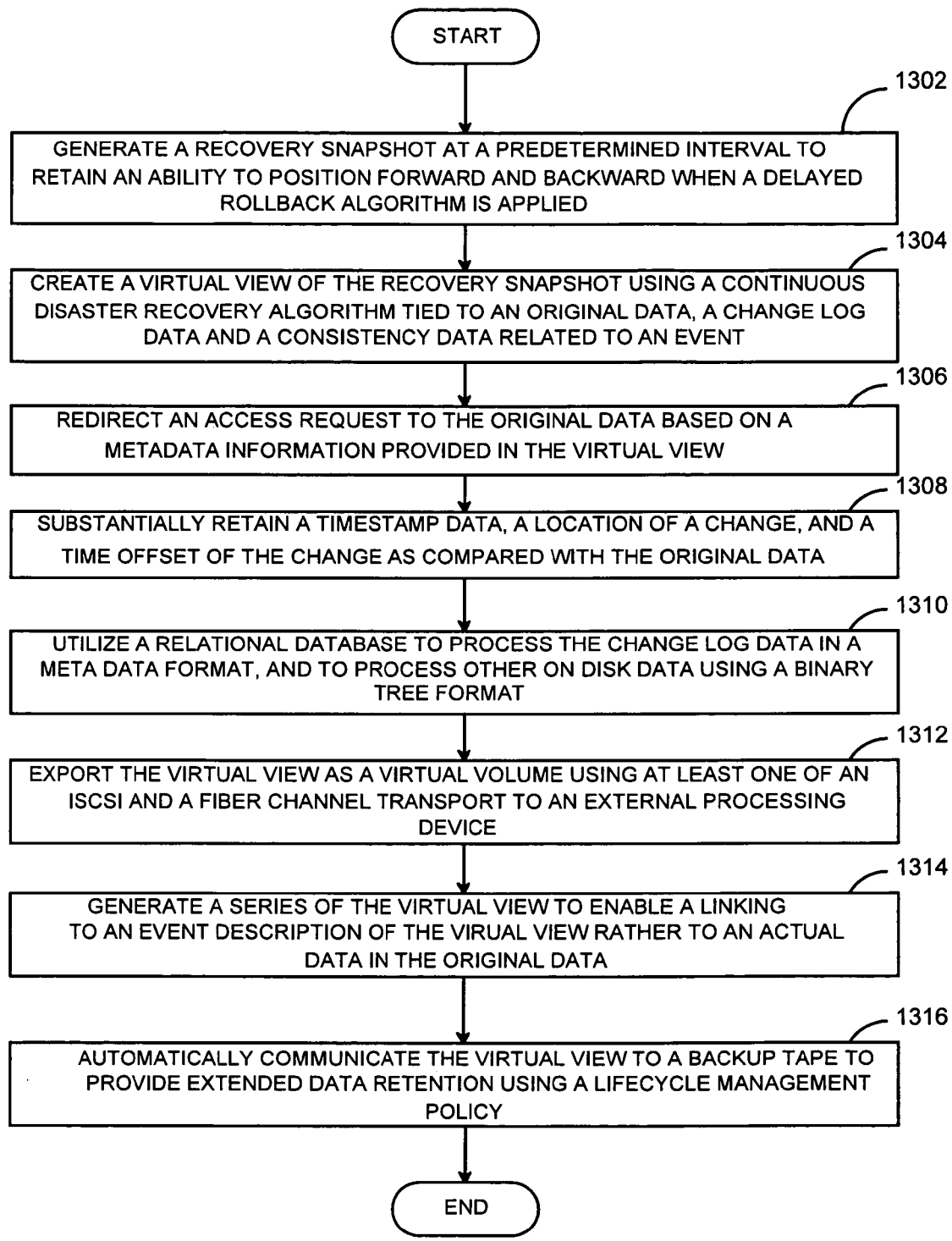
FIG. 13 is a process flow to generate a recovery snapshot at a predetermined interval to retain an ability to position forward and backward when a delayed roll back algorithm is applied, according to one embodiment.

FIG. 13 is a process flow to generate a recovery snapshot at a predetermined interval to retain an ability to position forward and backward when a delayed roll back algorithm (e.g., the delayed roll back algorithm of the delayed roll backward module 1004 of FIG. 10) is applied, according to one embodiment.

In operation 1302, a recovery snapshot may be generated at a predetermined interval (e.g., midnight, every 5 minutes, etc.) to retain an ability to position forward and backward when a delayed roll back algorithm (e.g., the delayed roll back algorithm of the delayed roll backward module 1004 of FIG. 10) is applied. In operation 1304, a virtual view of the recovery snapshot may be created using an algorithm (e.g., the continuous disaster recovery algorithm of the continuous data protection module 1000 of FIG. 10) tied to an original data, a change log data, and a consistency data related to an event (e.g., midnight, every 5 minutes, system crash, configuration change, failed log-in, and/or as indicated by the events module 808 of FIG. 8, etc.). In operation 1306, an access request to the original data may be redirected based on a meta-data information provided in the virtual view. In operation 1308, a timestamp data, a location of a change, and a time offset of the change as compared with the original data may be substantially retained.

In operation 1310, a relational database (e.g., SQL database) may be utilized to process the change log data in a meta-data format (e.g., the change log data of a metadata log file database 912 of FIG. 9), and to process other on-disk data using a binary-tree format. In operation 1312, the virtual view (e.g., the virtual view stored in the virtual view database 902 of FIG. 9) may be exported as a virtual volume using at least one of an iSCSI (e.g., the iSCSI module 914 of FIG. 9) and a fiber channel (e.g., the fiber channel module 924 of FIG. 9) transport to an external processing device. In operation 1314, a series of indexes of the virtual view may be generated (e.g., the virtual view generated by the instantiation module 900 of FIG. 9) to enable a linking to an event description (e.g., midnight, every 5 minutes, system crash, configuration change, failed log-in, and/or as indicated by the events module 808 of FIG. 8, etc.) of the virtual view rather than to an actual data in the original data.

In operation 1316, the virtual view may be automatically communicated (e.g., communicated by the export module 904 of FIG. 9) to a backup tape (e.g., through an iSCSI interface (e.g., the iSCSI module 914) and/or a fiber channel interface (e.g., the fiber channel module 924) of FIG. 9) to provide extended data retention using a lifecycle management policy.

Figure 14:
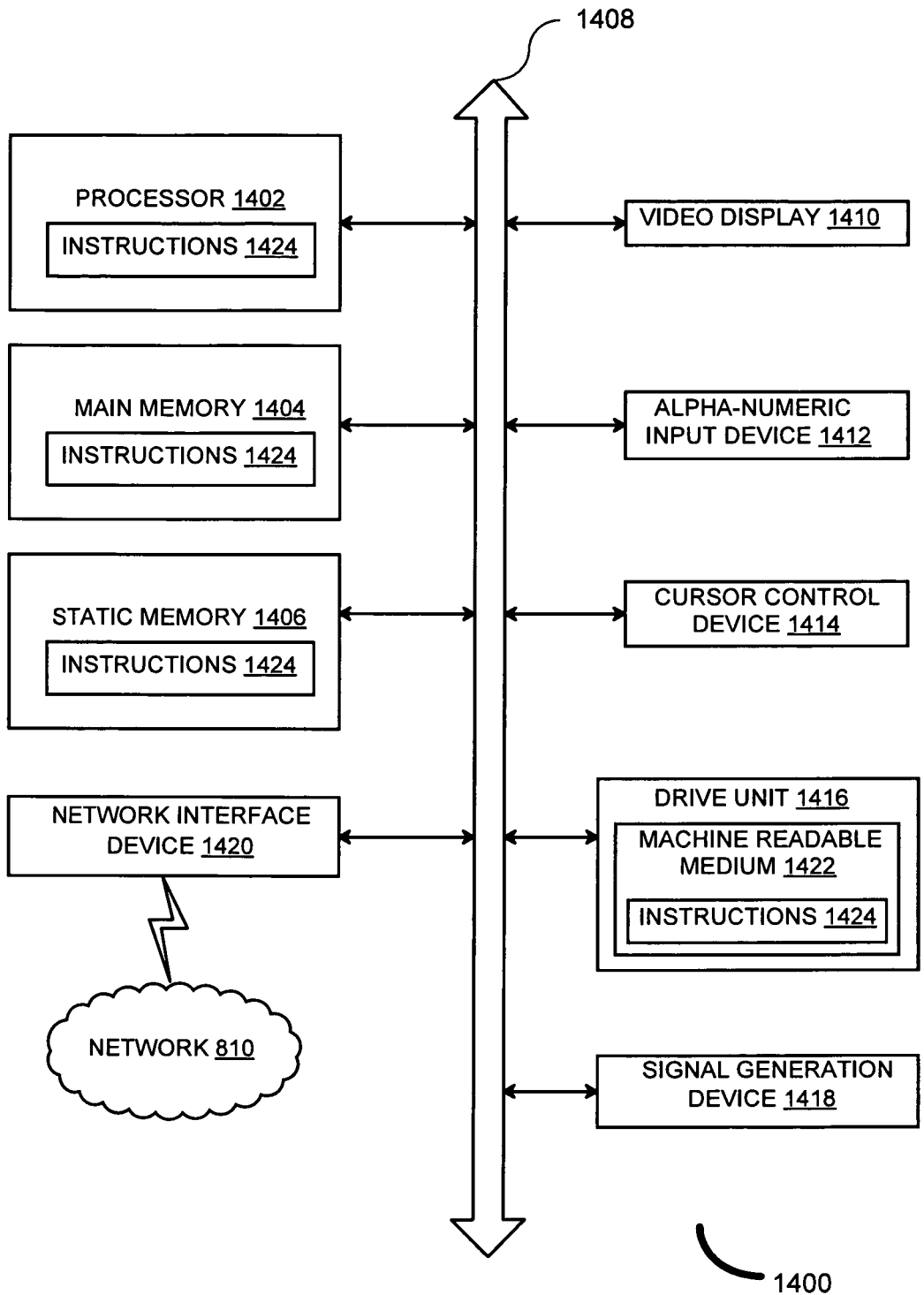
FIG. 14 is a diagrammatic representation of a machine in the form of a data processing system within which a set of instructions, for causing the machine to perform any one or more of the methodologies discussed herein, may be executed, according to one embodiment.

FIG. 14 shows a diagrammatic representation of a machine in the example form of a computer system 1400 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 1400 includes a processor 1402 (e.g., a central processing unit (CPU) a graphics processing unit (GPU) and/or both), a main memory 1404 and a static memory 1406, which communicate with each other via a bus 1408. The computer system 1400 may further include a video display unit 1410 (e.g., a liquid crystal display (LCD) and/or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., software 1424) embodying any one or more of the methodologies and/or functions described herein. The software 1424 may also reside, completely and/or at least partially, within the main memory 1404 and/or within the processor 1402 during execution thereof by the computer system 1400, the main memory 1404 and the processor 1402 also constituting machine-readable media.

The software 1424 may further be transmitted and/or received over a network 800 via the network interface device 1420. While the machine-readable medium 1422 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 15:
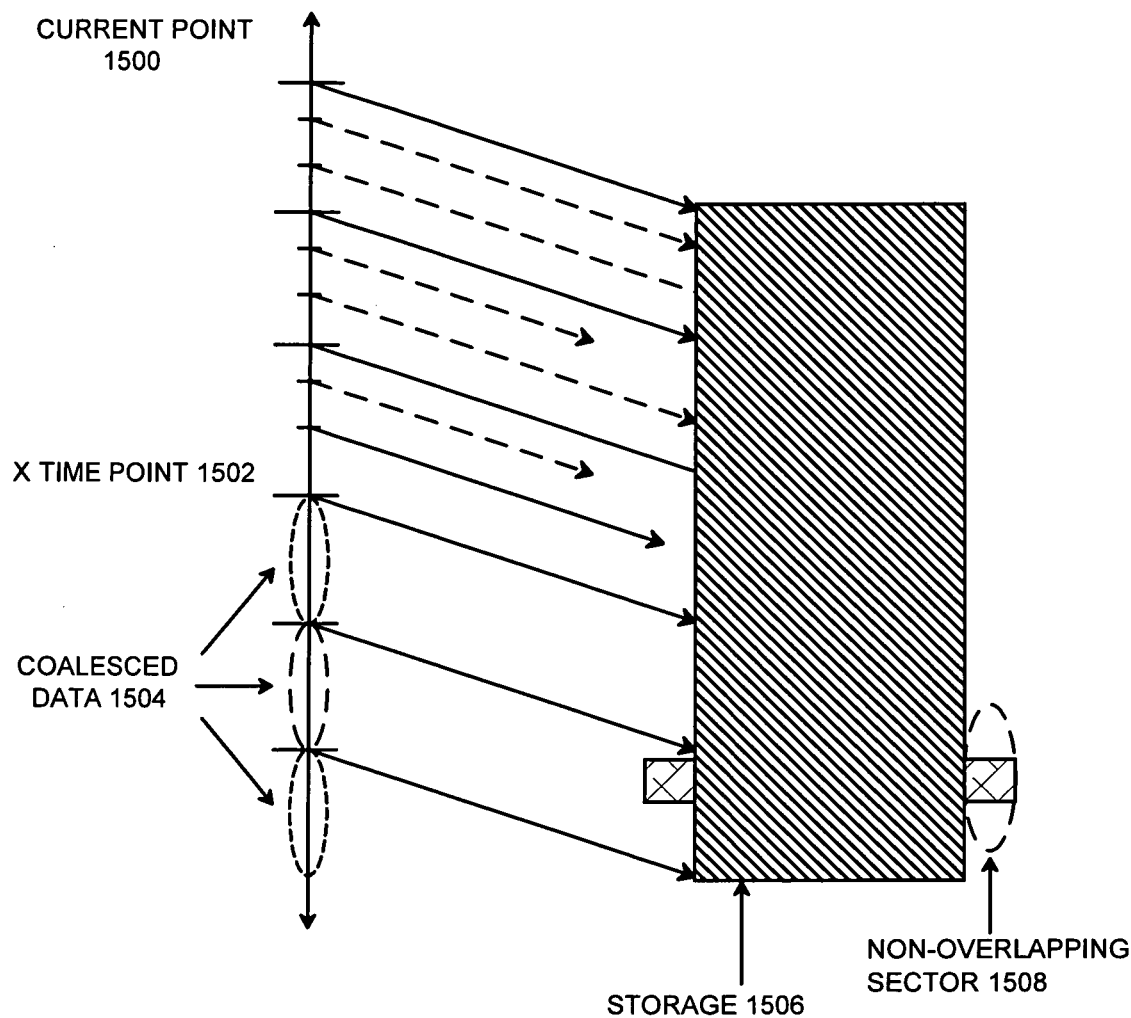
FIG. 15 is a graphical view of a coalesce process, according to one embodiment.

FIG. 15 is a graphical view of a coalesce process, according to one embodiment. Particularly, FIG. 15 illustrates a current point 1500 (e.g., a current time), a x-time point 1502, a coalesced data 1504, a storage 1506, and a non-overlapping sectors 1508. The current point 1500 may be the current day, time, and or window in the current temporal period. The x-time point 1502 may be a point in time in the past that is automatically determined and/or provided by a user.

The coalesced data 1504 may be a data that has been coalesced before the x-time point 1502. The storage 1506 may be a storage area of coalesced data. The non-overlapping sectors 1508 may be data that is outside the coalesce data blocks (e.g., data blocks that are not in a window of blocks that are repeatedly overwritten between events). The darker lines in FIG. 15 may represent a set of events at which data is backed up, and lighter lines (e.g., between the current point 808 and the x-time point 1502) may be intermediate backup points that are coalesced after the x-time point.

For example, the period between the current point 1500 and the x-time point 1502 may be a temporal window based on at least one of a user data and an automatically generated data. Data between events prior to the temporal window (e.g., before the x-time point 1502 of FIG. 15) may be coalesced. In addition, data between events after the temporal window may be captured (e.g., as illustrated by the lighter lines after the x-point 1502 in FIG. 15). The coalescing data between events prior to the temporal window may be determined by a set of overlapping operations to a data set, wherein certain operations have non-overlapping sectors which are not coalesced (e.g., the non-overlapping sectors 1508 may not be coalesced).

The present invention is not limited to SCSI, FC, or SAN architectures. DAS and NAS embodiments are possible wherein FC switches or Ethernet Hubs between separate networks are not required. Likewise, several SANs connected by a larger WAN may be provided secondary storage and recovery services from a central network-connected location, or from a plurality of systems distributed over the WAN. VIP security and tunneling protocols can be used to enhance performance of WAN-based distributed systems.

In addition, although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the client device 800, the storage module 802, the virtualization module 804, the recovery module 806, the events module 808, the network 810, the instantiation module 900, the export module 904, the pausing module 906, the iSCSI module 914, the fiber channel module 924, the continuous data protection module 1000, the delayed roll forward module 1002, the delayed roll backward module 1004, the coalescing module 1006, and/or the event detector module 1108 may be enabled using transistors, logic gates, and electrical circuits (e.g., application specific integrated ASIC circuitry) using a client device circuit, a storage module circuit, a virtualization circuit, a recovery circuit, an events circuit, a network circuit, an instantiation circuit, an export circuit, a pausing circuit, an iSCSI circuit, a fiber channel circuit, a continuous data protection circuit, a delayed roll forward circuit, a delayed roll backward circuit, a coalescing circuit, and/or an event detector circuit.

In addition, it will be appreciated that the various operations, processes, and methods disclosed herein may be embodied in a machine-readable medium and/or a machine accessible medium compatible with a processing system (e.g., a computer system), and may be performed in any order. Accordingly, the specification and drawings are to be regarded in an illustrative rather than a restrictive sense.

What is claimed is:

1. A method, comprising:
    generating a recovery snapshot of backed up data at a predetermined interval;
    creating a virtual view of the recovery snapshot around a recovery point using an algorithm tied to an original data, a change log data, and a consistency data related to an event associated with the recovery point and storing the virtual view instead of a data view of the recovery snapshot to reduce a time consumption and a capacity consumption associated therewith, the virtual view being created following at least one of a pause and a suspension of operation of a client device configured to originate a request associated with the backed up data, and the recovery point capable of being a system crash, a login failure, a configuration change and an automatic backup operation of data; and
    providing, through the recovery snapshot, an ability to position forward and backward from the recovery point when a delayed roll back algorithm is applied based on the virtual view, thereby providing an ability to roll to a data state occurring earlier in time compared to the recovery point and to a data state occurring later in time compared to the recovery point.

2. The method of claim 1, further comprising redirecting an access request to the original data based on metadata information provided in the virtual view.

3. The method of claim 1, further comprising substantially retaining a timestamp data, a location of a change, and a time offset of the change as compared to the original data.

4. The method of claim 1, further comprising utilizing a relational database to process the change log data in metadata format, and to process other on-disk data using a binary-tree format.

5. The method of claim 1, wherein the virtual view is specific to a volume object in a kernel that imitates a volume having the original data.

6. The method of claim 5, comprising managing the virtual view through a kernel space that is configured to process an access request through at least one table using metadata created in a retention log.

7. The method of claim 1, further comprising exporting the virtual view as a virtual volume using at least one of an Internet Small Computer System (iSCSI) and a fiber channel transport to an external processing device.

8. The method of claim 1, comprising applying the change log data when the virtual view is unfrozen after a user session reaches a level state.

9. The method of claim 1, further comprising:
    generating a series of indexes of the virtual view to enable linking to an event description of the virtual view rather than to an actual data in the original data; and
    automatically creating the virtual view in at least one of a scheduled and an event driven manner 10. The method of claim 1, further comprising automatically exporting the virtual view to a physical storage medium.

11. The method of claim 1, comprising executing instructions associated with enabling operations thereof through a processor communicatively coupled to a physical memory.

12. A non-transitory medium, readable through a computing system and including instructions embodied therein configured to be executable through the computing system comprising:
  instructions associated with generating a recovery snapshot of backed up data;
  instructions associated with creating a virtual view of the recovery snapshot around a recovery point using an algorithm tied to an original data, a change log data, and a consistency data related to an event associated with the recovery point and storing the virtual view instead of a data view of the recovery snapshot to reduce a time consumption and a capacity consumption associated therewith, the virtual view being created following at least one of a pause and a suspension of operation of a client device configured to originate a request associated with the backed up data, and the recovery point capable of being a system crash, a login failure, a configuration change and an automatic backup operation of data; and
  instructions associated with providing, through the recovery snapshot, an ability to position forward and backward from the recovery point when a delayed roll back algorithm is applied based on the virtual view, thereby providing an ability to roll to a data state occurring earlier in time compared to the recovery point and to a data state occurring later in time compared to the recovery point.

13. The non-transitory medium of claim 12, further comprising instructions associated with redirecting an access request to the original data based on metadata information provided in the virtual view.

14. The non-transitory medium of claim 12, further comprising instructions associated with substantially retaining a timestamp data, a location of a change, and a time offset of the change as compared to the original data.

15. The non-transitory medium of claim 12, further comprising instructions associated with utilizing a relational database to process the change log data in a metadata format, and to process other on-disk data using a binary-tree format.

16. The non-transitory medium of claim 12, comprising instructions associated with rendering the virtual view specific to a volume object in a kernel that imitates a volume having the original data.

17. The non-transitory medium of claim 16, comprising managing the virtual view through a kernel space that is configured to process an access request through at least one table using metadata created in a retention log.

18. A system, comprising:
  a memory; and
  a processor communicatively coupled to the memory, the processor being configured to execute instructions associated with enabling:
    generating a recovery snapshot of backed up data at a predetermined interval,
    creating a virtual view of the recovery snapshot around a recovery point using an algorithm tied to an original data, a change log data, and a consistency data related to an event associated with the recovery point and storing the virtual view instead of a data view of the recovery snapshot to reduce a time consumption and a capacity consumption associated therewith, the virtual view being created following at least one of a pause and a suspension of operation of a client device configured to originate a request associated with the backed up data, and the recovery point capable of being a system crash, a login failure, a configuration change and an automatic backup operation of data, and
    providing, through the recovery snapshot, an ability to position forward and backward from the recovery point when a delayed roll back algorithm is applied based on the virtual view, thereby providing an ability to roll to a data state occurring earlier in time compared to the recovery point and to a data state occurring later in time compared to the recovery point.

19. The system of claim 18, wherein the processor is further configured to execute instructions associated with enabling redirection of an access request to the original data based on metadata information provided in the virtual view.

20. The system of claim 18, wherein the processor is further configured to execute instructions associated with enabling substantial retention of a timestamp data, a location of a change, and a time offset of the change as compared to the original data.

* * * * *